(12) United States Patent
Breitenbach et al.

(10) Patent No.: US 9,923,402 B2
(45) Date of Patent: Mar. 20, 2018

(54) INDUCTIVE CHARGING DEVICE

(71) Applicant: Robert Bosch GmbH, Stuttgart (DE)

(72) Inventors: Jan Breitenbach, Stuttgart (DE);
Dragan Krupezevic, Stuttgart (DE);
Juergen Mack, Goeppingen (DE);
Guenter Lohr, Leinfelden-Echterdingen (DE); Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 61 days.

(21) Appl. No.: 14/654,578

(22) PCT Filed: Dec. 18, 2013

(86) PCT No.: PCT/EP2013/077162
§ 371 (c)(1),
(2) Date: Jun. 22, 2015

(87) PCT Pub. No.: WO2014/096048
PCT Pub. Date: Jun. 26, 2014

(65) Prior Publication Data
US 2015/0349577 A1    Dec. 3, 2015

(30) Foreign Application Priority Data

Dec. 21, 2012 (DE) .......... 10 2012 112 846
Feb. 1, 2013 (DE) .......... 10 2013 201 706
(Continued)

(51) Int. Cl.
H02J 7/00    (2006.01)
H02J 7/02    (2016.01)
(Continued)

(52) U.S. Cl.
CPC ........... *H02J 7/025* (2013.01); *B25F 5/00* (2013.01); *B25H 3/00* (2013.01); *H02J 7/0042* (2013.01);
(Continued)

(58) Field of Classification Search
CPC ...................................................... H02J 7/025
(Continued)

(56) References Cited

U.S. PATENT DOCUMENTS

| 8,421,407 | B2 * | 4/2013 | Johnson | H02J 5/005 |
| | | | | 108/65 |
| 2006/0087282 | A1 * | 4/2006 | Baarman | H02J 7/025 |
| | | | | 320/108 |
| 2010/0207771 | A1 * | 8/2010 | Trigiani | B60L 11/1816 |
| | | | | 340/636.1 |

FOREIGN PATENT DOCUMENTS

| JP | H10234138 | 9/1998 |
| JP | 2001238362 A | 8/2001 |

(Continued)

OTHER PUBLICATIONS

International Search Report for PCT/EP2013/077162, dated Dec. 3, 2014.

*Primary Examiner* — Yalkew Fantu
(74) *Attorney, Agent, or Firm* — Norton Rose Fulbright US LLP; Gerard Messina

(57) ABSTRACT

An inductive charging device is provided, in particular a hand-held power tool inductive charging device, which includes an inductive charging unit which is provided for transferring energy in a coupled state with an induction battery. It is provided that the inductive charging device includes a fastening unit which is provided, at least in part, (Continued)

for coupling the inductive charging unit to the at least one induction battery and/or to at least one external unit in at least one state.

10 Claims, 18 Drawing Sheets

(30) Foreign Application Priority Data

Jul. 5, 2013 (DE) .................. 10 2013 213 192
Dec. 17, 2013 (DE) .................. 10 2013 226 229

(51) Int. Cl.
*H02J 50/10* (2016.01)
*B25F 5/00* (2006.01)
*B25H 3/00* (2006.01)

(52) U.S. Cl.
CPC .......... *H02J 7/0044* (2013.01); *H02J 7/0045* (2013.01); *H02J 50/10* (2016.02)

(58) Field of Classification Search
USPC ........................................... 320/108
See application file for complete search history.

(56) References Cited

FOREIGN PATENT DOCUMENTS

| JP | 2005073350 | | 3/2005 | |
| JP | 2009262254 | | 11/2009 | |
| JP | 2010098861 | A | 4/2010 | |
| JP | 2010206881 | A | 9/2010 | |
| JP | 2011034793 | | 2/2011 | |
| JP | 2012029418 | A | 2/2012 | |
| JP | 2012518975 | A | 8/2012 | |
| JP | 2012190574 | A | 10/2012 | |
| WO | WO2009/108959 | | 9/2009 | |
| WO | WO 2009108959 | A1 * | 9/2009 | ............. A47B 96/02 |

* cited by examiner

INDUCTIVE CHARGING DEVICE

BACKGROUND INFORMATION

An inductive charging device has previously been provided.

SUMMARY

The present invention is directed to an inductive charging device, in particular a hand-held power tool inductive charging device, which includes an inductive charging unit which is provided for transferring energy in a coupled state with an induction battery.

It is provided that the inductive charging device includes a fastening unit which is provided, at least in part, for coupling the inductive charging unit to the at least one induction battery and/or to at least one external unit in at least one state.

In the present context, an "inductive charging unit" is understood in particular to mean a unit for charging the at least one induction battery, and which is provided for relaying a charging current, at least partially by electromagnetic induction, to the induction battery in at least one state of charge, and which includes at least one inductive charging coil. In the present context, an "inductive charging coil" is understood in particular to mean a coil which includes at least one winding made of an electrically conductive material, and which is provided for generating a magnetic field by applied electrical energy, in particular by an alternating voltage, in at least one state of charge, the magnetic field generating an alternating electric current in an inductive charging coil of the induction battery. In particular, the inductive charging coil is provided for converting an electromagnetic alternating field into an alternating electric current, and/or vice versa. The alternating field preferably has a frequency of 10 kHz-500 kHz, particularly preferably 100 kHz-120 kHz. In particular, the direction is provided perpendicularly with respect to the coil plane, in parallel to a winding axis of the inductive charging coil. The inductive charging unit preferably also includes at least one coil core unit for increasing an inductance of the at least one inductive charging coil.

The term "provided" is understood in particular to mean specially configured, designed, and/or equipped. Providing an object for a certain function is understood in particular to mean that the object meets and/or carries out this certain function in at least one use state and/or operating state.

In the present context, an "induction battery" is understood in particular to mean a device which preferably includes a rechargeable energy storage unit which is provided, at least in part, for storing energy for electrochemically generating an electric current with the aid of a reversible reaction, and for charging by introducing a charging current, and which is provided for supplying an electric machine, in particular a hand-held power tool, with current. The induction battery is preferably accommodated or detachably fastened in a receiving space in the electric machine, in particular the hand-held power tool. The induction battery may include at least one NiCd or NiMH rechargeable battery cell. The induction battery preferably includes at least one lithium-based rechargeable battery cell. In the present context, a "hand-held power tool" is understood in particular to mean an electrical device which is hand-operated by a user, such as in particular a power drill, a drill hammer, a saw, a plane, a screwdriver, a milling tool, a grinder, an angle grinder, and/or a multifunctional tool or a garden tool such as a hedge trimmer, shrub shears and/or grass shears, or some other design of the electrical device which appears meaningful to those skilled in the art.

In the present context, an "external unit" is understood in particular to mean a unit which has a design that is preferably completely separate from the inductive charging unit, and which is not necessary for operating the inductive charging unit.

The external unit may preferably be formed, at least in part, by a workbench, a toolbox, a toolbox holder, a tool holster, and/or some other external unit which appears meaningful to those skilled in the art. In the present context, "coupling" is understood in particular to mean the establishment of a preferably detachable connection, a retaining force between two components preferably being transmitted via a geometric engagement of the components with one another and/or a friction force between the components.

Due to the design according to the present invention of the inductive charging device, a preferably high level of flexibility and advantageous ease of use may be achieved with a simple design.

Moreover, it is provided that the fastening unit has a design which is separate, at least in part, from the inductive charging unit. In the present context, "separate, at least in part" is understood in particular to mean that the fastening unit and the inductive charging unit do not have shared components which are essential for operation. Advantageously flexible usability of the fastening device may be achieved in this way, in particular even with different inductive charging units.

In addition, it is provided that the fastening unit includes at least one fastening frame which at least partially encloses the inductive charging unit in at least an installed state. In the present context, "at least partially encloses" is understood in particular to mean that the fastening frame encloses the inductive charging unit in at least one plane, preferably in at least two planes which in particular are perpendicular to one another, and particularly preferably in three planes which in particular are perpendicular to one another, over an angular range of greater than 180°, preferably greater than 270°, particularly preferably 360°. In particular, the fastening frame preferably covers 70% maximum, preferably 60% maximum, preferably 50% maximum, and particularly preferably 40% maximum, of a surface of the inductive charging unit. A design of the fastening unit which preferably saves weight and space may be achieved in this way.

Furthermore, it is provided that the at least one fastening frame includes at least two frame elements which are at least partially connected to one another.

The at least two frame elements are preferably connected to one another in a form-fit and/or force-fit manner. In one particularly preferred exemplary embodiment, the at least two frame elements are screwed together. However, it is also conceivable for the at least two frame elements to be locked together or connected in some other way which appears meaningful to those skilled in the art. Alternatively or additionally, it is also conceivable for the at least two frame elements to be integrally joined to one another. A simple design of the fastening frame and an advantageously low level of production effort may be achieved in this way.

Moreover, it is provided that the at least one fastening frame forms a receiving area for accommodating the inductive charging unit, and a receiving area for accommodating the induction battery. The fastening frame preferably at least partially encloses the induction battery and the inductive charging unit in a coupled state. In the present context, "at least partially encloses" is understood in particular to mean that the fastening frame encloses the induction battery and the inductive charging unit in at least one plane, preferably in at least two planes which in particular are perpendicular to one another, and particularly preferably in three planes which in particular are perpendicular to one another, over an angular range of greater than 180°, preferably greater than 270°, particularly preferably 360°. The fastening frame preferably covers 70% maximum, preferably 60% maximum, preferably 50% maximum, and particularly preferably 40% maximum, of a surface of the inductive charging unit. A preferably compact design of the inductive charging device may be achieved in this way.

In addition, it is provided that the fastening unit includes at least one fastening element which is fixedly mounted on a housing of the inductive charging unit. In the present context, "fixedly mounted" is understood in particular to mean that the at least one fastening element, at least in a state of charge, is at least partially captively coupled to the housing of the inductive charging unit. Advantageously great ease of use may be achieved in this way.

Furthermore, it is provided that the at least one fastening element is designed, at least in part, as a groove. A design of the fastening unit which is simple, advantageously robust, and preferably inexpensive may be achieved in this way.

Moreover, it is provided that the inductive charging device includes at least one retaining element which, at least in part, has a design which corresponds to the fastening frame. An advantageously compact design of the inductive charging device may be achieved in this way.

In addition, it is provided that the at least one fastening element is designed as a retaining tab. In the present context, a "retaining tab" is understood in particular to mean an element which has a flat shape at least in part, a thickness being in particular 50% maximum, preferably 30% maximum, and particularly preferably 10% maximum, of a smallest extension in a main plane of extension of the retaining tab, and which is provided, at least in part, at least for a form-fit fastening of the induction battery, at least in a coupled state. A preferably simple and advantageously reliable fastening of the induction battery may be achieved in this way.

Furthermore, it is provided that the at least one fastening element, designed as a retaining tab, is detachably connected to the housing of the inductive charging unit. In the present context, "detachably connected" is understood in particular to mean "nondestructively separable." An advantageously high level of flexibility and usability of the inductive charging unit may thus be achieved, with the at least one fastening element designed as a retaining tab and also without the at least one fastening element designed as a retaining tab.

Moreover, it is provided that the at least one fastening element designed as a retaining tab is at least partially elastically supported relative to the housing of the inductive charging unit. In the present context, "elastically supported" is understood in particular to mean that the at least one fastening element designed as a retaining tab is repeatedly deformable relative to the housing of the inductive charging unit, in particular without mechanical damage and/or destruction, and in particular after a deformation automatically seeks to return to an initial position. Advantageously great ease of use may be achieved in this way. In addition, damage to the at least one fastening element designed as a retaining tab during an impact after a fall of the inductive charging unit may be avoided.

In addition, a system which includes an inductive charging device according to the present invention and at least one induction battery, in particular at least one hand-held power tool induction battery, is provided.

Furthermore, an inductive charging unit, in particular a hand-held power tool inductive charging unit, of an inductive charging device according to the present invention is provided.

Moreover, a fastening unit of an inductive charging device according to the present invention is provided.

In another embodiment, the present invention may be directed to a system, preferably a charging system, in particular an inductive charging system, which includes a fastening unit and an inductive charging unit. The fastening unit includes a system holder. It may be provided that the system holder delimits a receiving area which is provided for accommodating the inductive charging unit and a charge interface of a unit to be charged, in particular the induction battery. In the present context, a "charging system" is understood in particular to mean a device which is provided for transmitting electrical energy from an inductive charging unit to the unit, which in particular is designed, at least in part, as an induction battery, and which is provided in particular for charging a battery unit which is integrated into the unit, and storing the unit at least during the charging operation. In one particularly preferred exemplary embodiment, the rechargeable battery unit includes the induction battery. In the present context, a "rechargeable battery unit" is understood in particular to mean an electrical energy store. The rechargeable battery unit may include at least one NiCd or NiMH rechargeable battery cell. The rechargeable battery unit preferably includes at least one lithium-based rechargeable battery cell.

In the present context, an "inductive charging system" is understood in particular to mean a charging system in which the energy transmission from an inductive charging unit to the unit, in particular to the induction battery, takes place inductively. In particular, the inductive charging unit may contain at least one coil which is provided for emitting an electromagnetic field, and the unit, in particular the induction battery, may contain at least one coil which is provided for receiving the electromagnetic field and converting it into an alternating current. The unit, in particular the induction battery, preferably includes charging electronics which are provided for rectifying the alternating current and controlling a current intensity and/or voltage for the charging operation of the rechargeable battery unit corresponding to a state of charge of the rechargeable battery unit.

In the present context, a "charge interface" is understood in particular to mean an area of the unit, in particular of the induction battery, which is provided for transmitting energy to the unit and supporting the unit, in particular the induction battery. The charge interface preferably has a fixed geometry which is coordinated with the system. The charge interface particularly preferably has a symmetrical design. In the present context, a "unit" is preferably understood to mean a unit rechargeable battery and/or a rechargeable battery pack, in particular a hand-held power tool rechargeable battery, and/or a hand-held power tool having an integrated rechargeable battery unit, and particularly preferably an induction battery. The induction battery preferably has an interface, which is detachable by a user, for connecting the induction battery to a hand-held power tool. In the present context, a "hand-held power tool" is understood in particular to mean a power tool which is hand-operated by the user, such as in particular a power drill, a drill hammer, a saw, a plane, a screwdriver, a milling tool, a grinder, an angle grinder, and/or a multifunctional tool or a garden tool such as a hedge trimmer, shrub shears and/or grass shears, and/or a lighting device, such as in particular a hand lamp, and/or a measuring device, such as in particular a laser rangefinder.

The system holder advantageously has a one-piece design and is made of a plastic material. The term "provided" is understood in particular to mean specially designed and/or equipped. The system holder may advantageously accommodate the inductive charging unit and the unit to be charged, in particular the induction battery, and may ensure a position between the inductive charging unit and the unit, in particular the induction battery, which is suitable for the charging operation. In particular, the system may be suitable for charging a plurality of different units, such as induction batteries, hand-held power tool rechargeable batteries, and hand-held power tools which include an integrated rechargeable battery unit, which have a charge interface that is adapted to the system. The system may advantageously be suitable for charging a hand-held power tool rechargeable battery, in particular an induction battery, which is inserted into a hand-held power tool, and for positioning the hand-held power tool rechargeable battery with the hand-held power tool. Removing the hand-held power tool rechargeable battery from the hand-held power tool during the charging operation may be dispensed with. The system may advantageously include multiple different inductive charging units. The number of different units, in particular induction batteries, which may be charged using the system may be further increased. The system may be used for charging units having different shapes, sizes, voltage classes, rechargeable battery pack sizes, and masses.

In addition, it may be provided that the system holder includes a fastening means which is provided for supporting the system in a movably suspended manner about at least one oscillating axis in an operational state. In the present context, an "operational state" is understood in particular to mean a state in which the system is suitable for charging the unit, in particular the induction battery. In particular, in an operational state the inductive charging unit and the charge interface of the unit, in particular of the induction battery, are situated in the receiving area of the system holder, and the inductive charging unit and the induction battery are positioned relative to one another via the system holder.

In the present context, a "suspended" support is understood in particular to mean a support in which a weight force acting on the system is balanced by a force, in particular a tensile force, acting on the fastening means. The fastening means may preferably be designed as a hook, eye, loop, or in particular bar on which the system may be hung, for example, on a nail, an eye, or a similar device. In the present context, "movable about an oscillating axis" is understood in particular to mean that only small torques are transmitted about this axis in a suspended state. In the present context, a "small" torque is understood in particular to mean a torque which permits an oscillating motion of the system about the oscillating axis, so that the suspended system is able to move about this axis into a position in which the suspended support about this axis is torque-free. Forces and in particular torques which are required for a suspended support may be particularly small.

A fastening means for supporting the system may be exposed to particularly small forces and torques. The support may be particularly robust and secure. The system may accommodate the charge interface of particularly large and/or heavy units and inductive charging units. Units, in particular induction batteries, having a particularly large range of different housing shapes and/or masses and/or centers of gravity may be charged using the system. The system may automatically orient itself about the oscillating axis corresponding to the center of gravity of the unit to be charged, in particular the induction battery. The system may be particularly well suited for keeping and/or storing the units, in particular the induction batteries. The fastening means may particularly preferably be rotatably supported about the oscillating axis on the system holder. Via the unit to be charged, in particular the induction battery to be charged, the suspended supported system may be rotated particularly well into a position with respect to the fastening means in which a torque-free suspended support of the system on the fastening means is possible.

It may be provided that the fastening means is situated at least essentially on a side of the system holder facing away from the receiving area. In the present context, "at least essentially" is understood in particular to mean "largely." In particular, an area of the fastening means which is provided for suspending the system, at least in a suspended state of the system, may be situated on the side of the system holder facing away from the receiving area. The situation may advantageously be avoided that a housing geometry of a unit to be charged, in particular the induction battery to be charged, overlaps with the fastening means. It may be ensured that different units to be charged, in particular induction batteries, may be suspended with the aid of the fastening means of the system.

In addition, it may be provided that the receiving area includes bearing means for supporting the inductive charging unit and the charge interface of the unit to be charged, in particular the induction battery to be charged. The bearing means are preferably provided for a form-fit support of the inductive charging unit and/or the charge interface. The system holder may ensure the position of the inductive charging unit with respect to the charge interface in a particularly effective manner.

In addition, it may be provided that the bearing means are provided for supporting the inductive charging unit and the charge interface separated by an air gap. In the present context, an "air gap" is understood in particular to mean a vertical distance between the oppositely situated sides of the inductive charging unit and of the charge interface. The air gap is preferably 1 mm to 5 mm, particularly preferably 2.5 mm to 3.5 mm. The air gap may ensure a particularly simple and/or ergonomic insertion and/or removal of the unit, in particular the induction battery, together with the charge interface. In particular, the bearing means may be designed in such a way that the unit, in particular the induction battery, has a play with the charge interface with respect to the system holder, so that the precision with which the unit, in particular the induction battery, must be inserted may be reduced. A collision of the charge interface with the inductive charging unit during insertion of the unit, in particular the induction battery, may be avoided.

In addition, it may be provided that the receiving area is provided for accommodating the inductive charging unit and the charge interface in the same insertion direction. The receiving area for supporting the inductive charging unit and/or the charge interface may preferably include projections, in particular rails, onto which the inductive charging unit and/or the charge interface may be pushed. The inductive charging unit and/or the charge interface may have channels, grooves, and/or shoulders which are provided for being supported on the projections and/or rails of the receiving area. A particularly simple, effective, inexpensive, and robust support of the charge interface and/or the inductive charging unit by the system holder may be possible. Inserting the inductive charging unit and/or the charge interface into the receiving area of the system holder may be particularly simple.

In addition, it may be provided that at least one of the bearing means includes securing means which are provided for fixing the inductive charging unit and/or the charge interface in a charging position. In particular, the bearing means may include shoulders and/or steps which are provided for fixing the inductive charging unit and/or the charge interface in the charging position in a form-fit manner. The inductive charging unit and/or the charge interface preferably have/has corresponding recesses with which the shoulders and/or steps of the bearing means of the receiving area of the system holder engage in the charging position. The form-fit connection of the shoulders and/or steps with the recesses in a suspended state of the system may preferably be detached by lifting the inductive charging unit and/or the charge interface against the weight force. The unit, in particular the induction battery, together with the charge interface and/or the inductive charging unit may advantageously be removed by lifting it against the weight force and pushing it out. In a suspended state, the weight force may ensure the form-fit connection of the securing means and the charging position. A particularly secure, simple, and inexpensive design of the securing means may be possible.

In addition, it may be provided that the receiving area is provided for accommodating the inductive charging unit and/or the unit, in particular the induction battery, in at least two orientations. In particular, the receiving area may be provided for accommodating the inductive charging unit and/or the unit, in particular the induction battery, from two opposite sides relative to the insertion direction, and/or accommodating in two orientations which are rotated by 180° with respect to an axis perpendicular to the insertion direction, and with respect to the oscillating axis. Using the system may be particularly convenient. In particular, the inductive charging unit and/or the unit, in particular the induction battery, may be inserted from a side which is particularly convenient for the user. The situation may be avoided that the inductive charging unit and/or the unit are/is accidentally inserted in an impermissible orientation.

In addition, it may be provided that the receiving area encloses the inductive charging unit by greater than 180° about an axis. In particular, the inductive charging unit in an operational state, with the exception of a power supply line, may be situated completely within the receiving area. The inductive charging unit may be protected particularly well by the system holder. The inductive charging unit together with the system holder may form a compact unit.

In addition, it may be provided that the system includes a hand-held power tool rechargeable battery, in particular an induction battery, and/or a chargeable hand-held power tool together with the charge interface. The charge interface may be coordinated with the system holder and/or the inductive charging unit. The hand-held power tool rechargeable battery, in particular the induction battery, preferably includes a unit interface, which is independent from the charge interface, for connecting the hand-held power tool rechargeable battery, in particular the induction battery, to a hand-held power tool. The charge interface and the unit interface are particularly advantageously situated on opposite sides of the hand-held power tool rechargeable battery, in particular the induction battery. The charge interface may be particularly well accessible via the unit interface connected to the hand-held power tool. In particular, the hand-held power tool rechargeable battery, in particular the induction battery, together with the charge interface may be inserted into the system, and at the same time, connected via the unit interface to an interface of the hand-held power tool. The hand-held power tool rechargeable battery, in particular the induction battery, may be inserted together with the hand-held power tool into the system. The hand-held power tool rechargeable battery, in particular the induction battery, and the hand-held power tool may be stored and/or charged suspended together, using the system.

In addition, it is conceivable for the at least one fastening frame to include at least two bearing lugs which engage with the at least one fastening element, designed as a groove, of the inductive charging unit for guiding the bearing lugs in an insertion direction during an insertion operation. In an inserted state, the inductive charging unit may be supported on the fastening frame at least essentially by the bearing lugs. The fastening frame may include at least one fastening element having at least one of the bearing lugs, and having at least one spring element which elastically positions the bearing lugs at least essentially perpendicularly with respect to the insertion direction. The grooves of the inductive charging unit, at least in an inserted operating state, may exert a force on the bearing lugs which at least partially deflects the bearing lugs inwardly. In particular, the fastening frame may be supported on the inductive charging unit at least essentially by the forces exerted by the grooves on the bearing lugs. In the present context, "at least essentially" is understood in particular to mean that the forces exerted on the bearing lugs constitute more than 75%, preferably more than 90%, of the forces acting between the fastening frame and the inductive charging unit.

In the present context, a "bearing lug" is understood in particular to mean a projection which is provided for a force-fit and in particular form-fit support of the fastening frame on the groove of the inductive charging unit. A "groove" is understood in particular to mean an elongated recess in the insertion direction which is introduced in particular into at least a portion of a housing, and which is provided for accommodation and force-fit and in particular form-fit support of the bearing lugs. The fastening frame may preferably be supported on the at least one groove of the inductive charging unit solely via the bearing lugs. The inductive charging unit preferably includes at least two oppositely situated grooves perpendicular to the insertion direction. In each case at least two, particularly advantageously in each case exactly two, of the bearing lugs of the fastening frame are advantageously provided for being inserted into a groove of the inductive charging unit. It is possible for the fastening frame and the inductive charging unit to include further components which generate bearing forces, such as stop means and/or interfaces. In particular, the inductive charging unit may include an electrical battery interface which in addition to electrical contacting of the inductive charging unit results in additional bearing forces.

In the present context, an "insertion direction" is understood in particular to mean a preferably linear direction along which the bearing lugs of the fastening frame may be inserted into the groove of the inductive charging unit. In the present context, a "spring element" is understood in particular to mean an element which is provided for generating a restoring force during a deflection in a spring direction. A deflection of the spring element and/or of the bearing lug during the insertion operation may be at least 0.1 mm, preferably 0.5 mm, and particularly preferably greater than 1 mm. An advantageous compensation for a bearing play between the bearing lugs and grooves may take place. The support of the inductive charging unit on the fastening frame may have pretensioning, and may be free of play. Mechanical tolerances may be compensated for. A positioning of the fastening frame and the inductive charging unit with respect to one another may be particularly well reproducible during multiple insertion operations, and may have particularly small deviations from one another. Further bearing means which engage with the grooves, in particular support rails, may be dispensed with.

It is provided that the grooves of the inductive charging unit for guiding the fastening frame during the insertion operation exert a force on the bearing lugs which at least partially deflects the bearing lugs inwardly. The bearing lugs may be supported on the grooves during the insertion operation. Tilting of the inductive charging unit during insertion into the fastening frame may be avoided. The inductive charging unit is preferably centerable on the fastening frame during the insertion operation. Jamming of the fastening frame and the inductive charging unit during the insertion may be avoided. Dimensional deviations of the grooves, in particular due to deposits of dirt, may be compensated for. The inductive charging unit may preferably be guided on the fastening frame during the insertion operation at least largely by the bearing lugs, particularly preferably solely by the bearing lugs. The fastening frame is preferably in contact solely via its bearing lugs with the grooves of the inductive charging during the insertion operation. Further guide means which engage with the grooves, in particular guide rails, may be dispensed with.

Multiple spring elements are particularly advantageously provided which in each case cushion a bearing lug. The bearing lugs are preferably elastically supported by the spring elements. The bearing lugs may advantageously deflect inwardly, independently of one another. Bearing forces on the bearing lugs may be particularly uniform. Jamming of individual bearing lugs and/or bearing play at individual bearing lugs may be avoided.

In addition, it is provided that the grooves have at least one detent recess with which at least one of the bearing lugs engages in the inserted operating state. The grooves preferably each have a detent recess in a supporting position of the bearing lugs. In the present context, a "detent recess" is understood in particular to mean a recess in the groove into which the bearing lugs are pushed by the restoring force of the spring element. The fastening frame may advantageously be fixed to the inductive charging unit in the insertion direction. A user may detach the fastening frame from the inductive charging unit by acting on the inductive charging unit with a force, against the insertion direction, which exceeds a force that is necessary for pushing back the bearing lugs from the grooves and detaching the detent connection. The force that is necessary for detaching the detent connection may be suitably determined, among other ways, via the depth and geometry of the detent recesses.

In addition, it is provided that the grooves have an at least essentially circular or parabolic groove profile. In the present context, a "groove profile" is understood in particular to mean a geometry of a cross section perpendicular to the insertion direction. In the present context, a "circular or parabolic" groove profile is understood in particular to mean that a base of the groove is circular or parabolic. In the present context, "at least essentially" is understood in particular to mean a deviation from the circular and/or parabolic shape of less than 20%, preferably less than 10%, and particularly preferably less than 5%, of a depth of the groove. The bearing lugs may preferably have a sliding surface profile, in particular a circular and/or parabolic profile, which at least on their sliding surfaces is adapted to the profile of the groove. The bearing lug is advantageously centerable in the groove by the restoring force of the spring elements. In another embodiment of the bearing lugs, they may have a tapered profile, which may be rounded on the sliding surface of the particular bearing lug. The sliding surface may in particular be small. The design may be such that inserting the inductive charging unit into the fastening frame is particularly smooth.

In one alternative embodiment of the present invention, it is provided that the grooves have a flank in parallel to an insertion plane. In the present context, an "insertion plane" is understood in particular to mean a plane which is formed by the insertion direction and the spring directions of the bearing lugs. A further flank of the groove is preferably inclined in particular by 45° to 80° and particularly preferably by 55° to 70° relative to the insertion plane. The bearing lugs, at least on their sliding surfaces, preferably have a sliding surface profile which is adapted to the groove, with one flank in parallel to the insertion plane and one flank inclined relative to the insertion plane. The bearing lugs may be guided particularly precisely in the grooves. A relative supporting position of the fastening frame and of the inductive charging unit with respect to one another, perpendicular to the support flanks which are in parallel to the insertion direction, may be maintained particularly precisely. Pressure forces in the direction of the parallel flanks of the grooves and/or of the bearing lugs may be absorbed particularly well.

Moreover, it is provided that the bearing lugs are movably supported along a direction extending at least essentially in parallel to the insertion plane. A particularly compact design of the fastening frame which is particularly flat and which requires little installation space may thus be achieved.

In addition, it is provided that the grooves along the insertion direction have an at least essentially uniform groove profile. In the present context, a "uniform" groove profile is understood in particular to mean that a groove cross section in particular over at least 70% of a groove length, preferably over at least 80% of the groove length, and particularly preferably over more than 90% of the groove length, has an at least essentially uniform design. In the present context, "at least essentially" is understood in particular to mean manufacturing-related deviations which are less than 10%, preferably less than 5%, and particularly preferably less than 1%, of the groove depth. In particular, the groove, outside of detent recesses, may have an at least essentially uniform groove profile. In particular, bevels and chamfers which are provided for introducing the bearing lugs into the grooves constitute in particular less than 10% and preferably less than 5% of the groove length. The inductive charging unit may be guided on the fastening frame in a particularly uniform manner during the insertion operation. The insertion operation may take place at least largely free of play. In particular, it may be possible to insert the inductive charging unit into the fastening frame on both sides. In the present context, "both sides" is understood in particular to mean that both insertion directions in parallel to the grooves are permissible.

In addition, it is provided that the spring elements are designed as bar spring elements on which the bearing lugs are situated. The bearing lugs together with the bar spring elements preferably have a one-piece design. The bar spring elements may absorb particularly large forces transverse to the spring direction. The bar spring elements may be particularly suited for deflecting inwardly in the spring direction and for supporting the bearing lugs in the other directions.

The spring elements together with the fastening frame particularly advantageously have a one-piece design. In particular, the spring elements together with the bearing lugs may be connected as one piece to the fastening frame. The fastening frame may preferably be formed, at least partially, from a plastic component, in particular a plastic component manufactured in an injection molding process. The fastening frame may be particularly inexpensive and/or robust. The installation effort for the fastening frame may be particularly low. The situation may be avoided that spring elements and/or bearing lugs come loose from the fastening frame.

In addition, it is provided that at least two bearing lugs, viewed along the insertion direction, are situated in succession. Secure fastening may advantageously be made possible in this way.

The inductive charging device according to the present invention is not intended to be limited to the use and specific embodiment described above. In particular, for fulfilling a mode of operation described herein, the inductive charging device according to the present invention may include a number of individual elements, components, and units which is different from a number stated herein.

DETAILED DESCRIPTION

Figure 1:
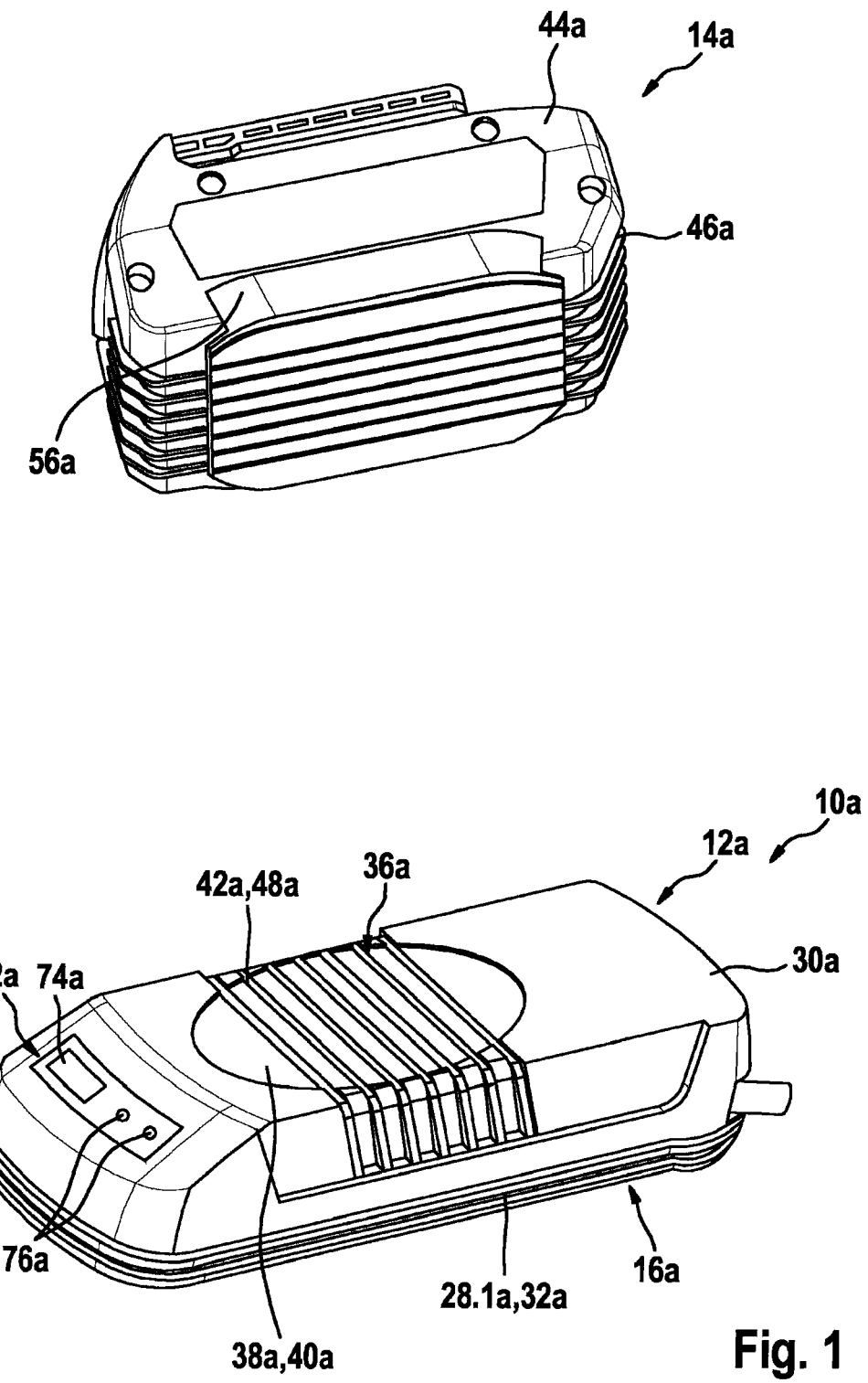
FIG. 1 shows a system which includes an inductive charging unit of an inductive charging device according to the present invention and an induction battery, in a perspective illustration.

FIG. 1 illustrates a system 90g which includes an inductive charging unit 12a and an induction battery 14a. Inductive charging unit 12a is provided for electrically charging induction battery 14a in a state of charge. Induction battery 14a is designed as a hand-held power tool induction battery. Induction battery 14a has a design which is inductively chargeable with the aid of inductive charging unit 12a. Induction battery 14a is designed to be coupleable to inductive charging unit 12a. Inductive charging unit 12a is provided for transmitting energy to induction battery 14a in a coupled state with induction battery 14a. Inductive charging unit 12a is designed as a hand-held power tool inductive charging unit. Inductive charging unit 12a is designed as an inductive charging device. Inductive charging unit 12a includes a charging coil, not illustrated, and a housing 30a. Housing 30a encloses the charging coil. The charging coil is provided for inductively transmitting energy to induction battery 14a in a state of charge.

Housing 30a of inductive charging unit 12a includes a receiving area 36a which is provided for accommodating induction battery 14a in a coupled state. Receiving area 36a forms a charge interface 94a of inductive charging unit 12a via which the electrical energy may be transmitted to induction battery 14a. Induction battery 14a likewise includes a housing 44a, which includes a positioning element 46a for coupling induction battery 14a to receiving area 36a of housing 30a of inductive charging unit 12a in a coupled state. Positioning element 46a of induction battery 14a is designed as a platform which rises above an outer surface of adjoining housing 44a of induction battery 14a. However, it is also conceivable for positioning element 40a of the inductive charging unit to be designed as a platform, and for positioning element 46a of the induction battery to be designed as a recess. Positioning element 46a of induction battery 14a, which is designed as a platform, forms a charge interface 96a of induction battery 14a. Receiving area 36a of housing 30a of inductive charging unit 12a has at least one recess 38a. Recess 38a has a shoulder height of at least 0.5 mm. Receiving area 36a of housing 30a of inductive charging unit 12a has multiple recesses 38a. Recess 38a forms a positioning element 40a for positioning induction battery 14a. Positioning element 46a of induction battery 14a has a shoulder height of at least 0.5 mm. Positioning element 40a of inductive charging unit 12a and positioning element 46a of induction battery 14a have corresponding designs. However, it is also conceivable for positioning element 40a of inductive charging unit 12a to be designed as a platform, and for positioning element 46a of induction battery 14a to be designed as a recess.

Positioning element 40a of inductive charging unit 12a and positioning element 46a of induction battery 14a each have a shoulder height of 3 mm. However, other dimensions which appear meaningful to those skilled in the art are conceivable. Positioning element 40a of inductive charging unit 12a has a partially curved outer contour. The outer contour of positioning element 40a of inductive charging unit 12a is round. Positioning element 46a of induction battery 14a has a partially curved outer contour. The outer contour of positioning element 46a of induction battery 14a is square with rounded corners. A diameter of positioning element 40a of inductive charging unit 12a corresponds at least approximately to a diagonal length of positioning element 46a of induction battery 14a. A small tolerance is provided between the dimensions of positioning element 40a of inductive charging unit 12a and positioning element 46a of induction battery 14a. The depths and the tolerances of positioning elements 40a, 46a of inductive charging unit 12a and induction battery 14a, respectively, must be coordinated with one another for an optimal feel for a user. Alternatively, it is also conceivable for the outer contour of positioning element 40a of inductive charging unit 12a to be square with rounded corners, and for the outer contour of positioning element 46a of induction battery 14a to be round. Furthermore, it is also conceivable for the outer contour of positioning element 40a of inductive charging unit 12a or positioning element 46a of induction battery 14a to have some other geometric shape which appears meaningful to those skilled in the art, in particular having rounded corners.

Receiving area 36a of housing 30a of inductive charging unit 12a has at least one additional recess 48a. Additional recess 48a forms a dirt removal element 42a. Receiving area 36a includes multiple additional recesses 48a designed as dirt removal elements 42a. Recesses 38a, 48a form a structuring of a portion of the surface of the housing of inductive charging unit 12a. Dirt removal elements 42a have a channel-shaped design. Dirt removal elements 42a are open at the side so that the dirt may fall out. Dirt removal elements 42a are also open at the top. Dirt removal elements 42a have a rectangular cross section. The shoulder height of dirt removal elements 42a is greater with respect to the surface of housing 30a of inductive charging unit 12a than with respect to positioning element 40a. Viewed in parallel to the surface of housing 30a of inductive charging unit 12a, the outer contour of positioning element 40a encloses dirt removal elements 42a. In a state of charge of the induction battery, dust and dirt particles which deposit within receiving area 36a of inductive charging unit 12a are removed with the aid of dirt removal elements 42a. Dirt removal elements 42a each have a shoulder height of 5 mm.

Moreover, inductive charging unit 12a includes a display unit 72a which is provided for outputting information to a user. Display unit 72a is provided for visually outputting information. In a state of charge, a user of display unit 72a may obtain information about a state of charge of induction battery 14a. Display unit 72a includes a display 74a and multiple LEDs 76a. Alternatively or additionally, however, other designs of display unit 72a are conceivable. Display unit 72a is situated at a front side of housing 30a of inductive charging unit 12a. Display unit 72a is situated on the front side of housing 30a of inductive charging unit 12a, which is beveled relative to an insertion direction. Readability of display unit 72a may thus be achieved, even in a state in which inductive charging unit 12a is inserted on a workbench, for example.

Figure 2A:
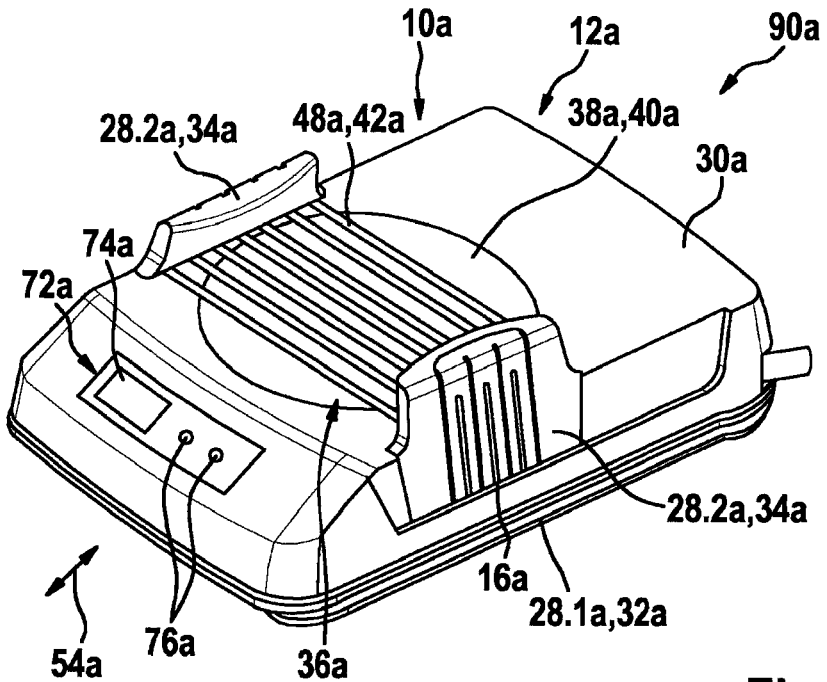
FIG. 2a shows the inductive charging device according to the present invention, including the inductive charging unit and a fastening unit, in a perspective illustration.

FIG. 2a illustrates an inductive charging device 10a which includes inductive charging unit 12a and a fastening unit 16a, which is provided for coupling inductive charging unit 12a to induction battery 14a in a coupled state. Fastening unit 16a includes at least one fastening element 28.1a, 28.2a, which in a coupled state is fixedly mounted on housing 30a of inductive charging unit 12a. Fastening unit 16a includes two fastening elements 28.2a which are designed as retaining tabs 34a. Fastening elements 28.2a are captively fastened to housing 30a of inductive charging unit 12a. Fastening elements 28.2a are detachably connected to housing 30a of inductive charging unit 12a. However, it is also conceivable for retaining tabs 34a to be designed as a fixed, nondetachable connection to housing 30a of inductive charging unit 12a. Fastening elements 28.2a are fastened to inductive charging unit 12a on opposite sides of housing 30a. Fastening elements 28.2a are made of plastic. Dirt removal elements 42a extend between fastening elements 28.2a, which are designed as retaining tabs 34a.

Figure 2B:
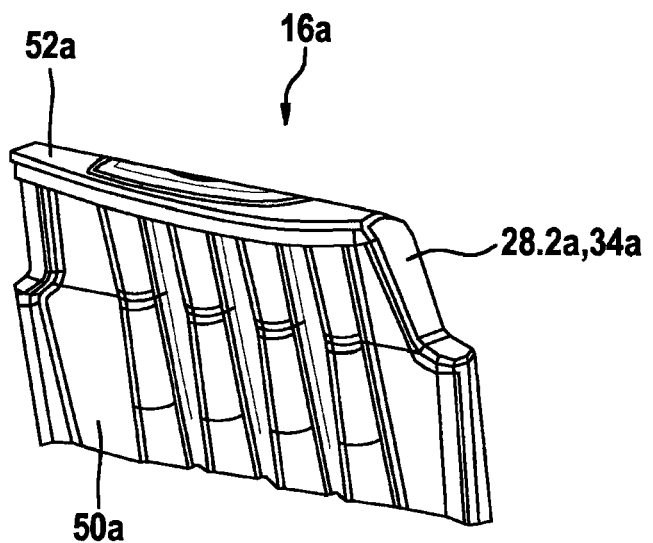
FIG. 2b shows a fastening element of the fastening unit of the inductive charging device according to the present invention, in a perspective illustration.

Each fastening element 28.2a has a first area 50a, which in an installed state extends in parallel to the side of housing 30a of inductive charging unit 12a on which fastening element 28.2a is situated. Each fastening element 28.2a has a further area 52a which extends perpendicularly with respect to first area 50a and in parallel to receiving area 36a of inductive charging unit 12a (FIG. 2b). For fastening induction battery 14a to inductive charging unit 12a, on which fastening elements 28.2a of fastening unit 16a are mounted, induction battery 14a is pushed onto inductive charging unit 12a in insertion direction 54a. In the process, positioning element 46a of induction battery 14a covers positioning element 40a of inductive charging unit 12a. Insertion direction 54a extends in parallel to a main direction of extension of inductive charging unit 12a. When induction battery 14a is inserted into fastening unit 16a of inductive charging device 10a, fastening elements 28.2a of fastening unit 16a, via their other areas 52a, engage in each case with a retaining element 56a which is integrally molded onto housing 44a of induction battery 14a. The other areas 52a of fastening elements 28.2a overlap retaining elements 56a of induction battery 14a transversely with respect to insertion direction 54a.

Positioning element 46a of induction battery 14a contacts a surface of housing 30a of inductive charging unit 12a when induction battery 14a is pushed on. As soon as induction battery 14a is pushed onto inductive charging unit 12a in such a way that positioning element 46a of induction battery 14a is situated above receiving area 36a of inductive charging unit 12a, positioning element 46a of induction battery 14a locks into positioning element 40a of inductive charging unit 12a. The locking is haptically perceivable by a user, and indicates to the user a positioning of induction battery 14a relative to inductive charging unit 12a which is optimal for an inductive charging operation. In the process, the other areas 52a of fastening elements 28.2a push induction battery 14a, perpendicularly with respect to insertion direction 54a, over retaining elements 56a toward inductive charging unit 12a. Retaining elements 56a are formed by projections. Induction battery 14a is coupled to inductive charging unit 12a in a form-fit and force-fit manner by positioning elements 40a, 46a and fastening elements 28.2a.

Fastening elements 28.2a, designed as retaining tabs 34a, are elastically supported relative to housing 30a of inductive charging unit 12a, so that fastening elements 28.2a push against induction battery 14a perpendicularly with respect to housing 30a of inductive charging unit 12a. Fastening elements 28.2a, designed as retaining tabs 34a, are supported via a double suspension, not illustrated, on housing 30a of the inductive charging unit. Fastening elements 28.2a, designed as retaining tabs 34a, are detachably fastened to housing 30a of inductive charging unit 12a. Fastening elements 28.2a are elastically supported, so that during an impact after a fall of inductive charging unit 12a, fastening elements 28.2a preferably do not break off, but instead cushion the impact, or preferably nondestructively detach from housing 30a of inductive charging unit 12a.

Figure 3A:
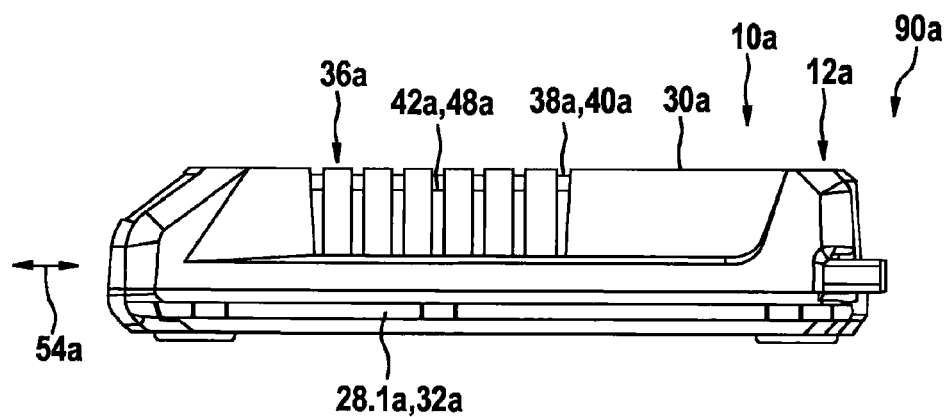
FIG. 3a shows the inductive charging device according to the present invention in a front view.
Figure 3B:
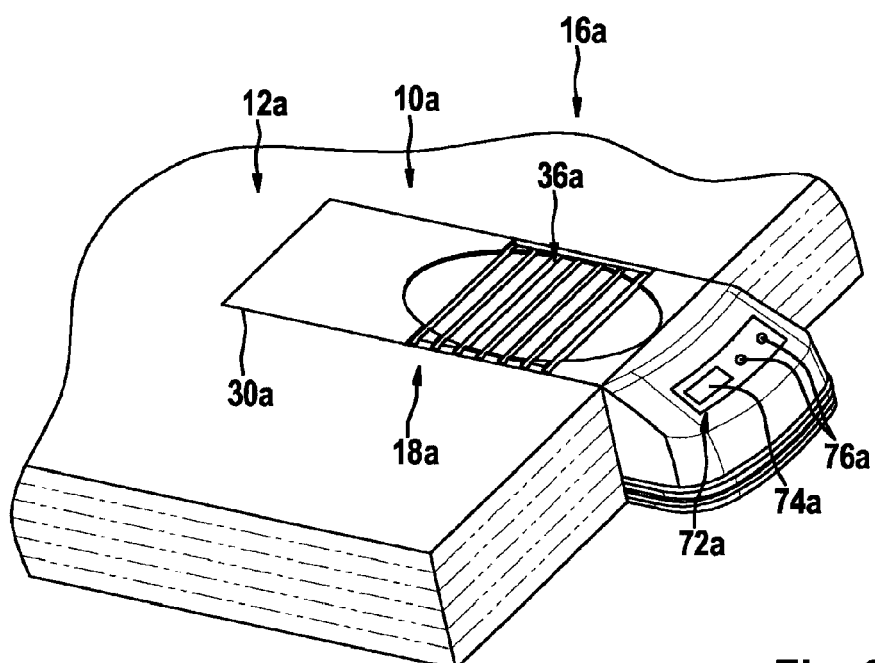
FIG. 3b shows the inductive charging device according to the present invention in a coupled state with an external unit, in a front view.

Fastening unit 16a is also provided for coupling inductive charging unit 12a to at least one external unit 18a in a coupled state. For this purpose, fastening unit 16a includes an additional fastening element 28.1a which is provided on housing 30a of inductive charging unit 12a (FIG. 3a). Additional fastening element 28.1a is designed as a groove 32a. Fastening unit 16a includes two additional fastening elements 28.1a which are designed as a groove 32a. Additional fastening elements 28.1a, designed as a groove 32a, are introduced into housing 30a of inductive charging unit 12a. Grooves 32a are provided on inductive charging unit 12a on opposite sides of housing 30a. Grooves 32a extend in parallel to the main direction of extension of inductive charging unit 12a. Grooves 32a are provided for fastening inductive charging unit 12a in a receiving area of external unit 18a, such as a workbench, a toolbox, a toolbox holder, a tool holster, and/or some other external unit which appears meaningful to those skilled in the art, with the aid of a tongue and groove connection (FIG. 3b). Additional fastening elements 28.1a may also be formed by a dovetail groove. In addition, detent elements may be provided, which are provided for locking to external unit 18a in a coupled state of inductive charging unit 12a.

FIGS. 4 through 22 show further exemplary embodiments of the present invention. The following descriptions and the drawings are limited essentially to the differences between the exemplary embodiments, whereby in principle, with regard to identically denoted components, in particular with regard to components having identical reference numerals, reference may also be made to the drawings and/or the description of the other exemplary embodiments, in particular in FIGS. 1 through 3b. To distinguish between the exemplary embodiments, the letter a is added as a suffix to the reference numerals in the exemplary embodiment in FIGS. 1 through 3b, and the letters b through g are added as a suffix to the exemplary embodiments in FIGS. 4 through 22.

Figure 4:
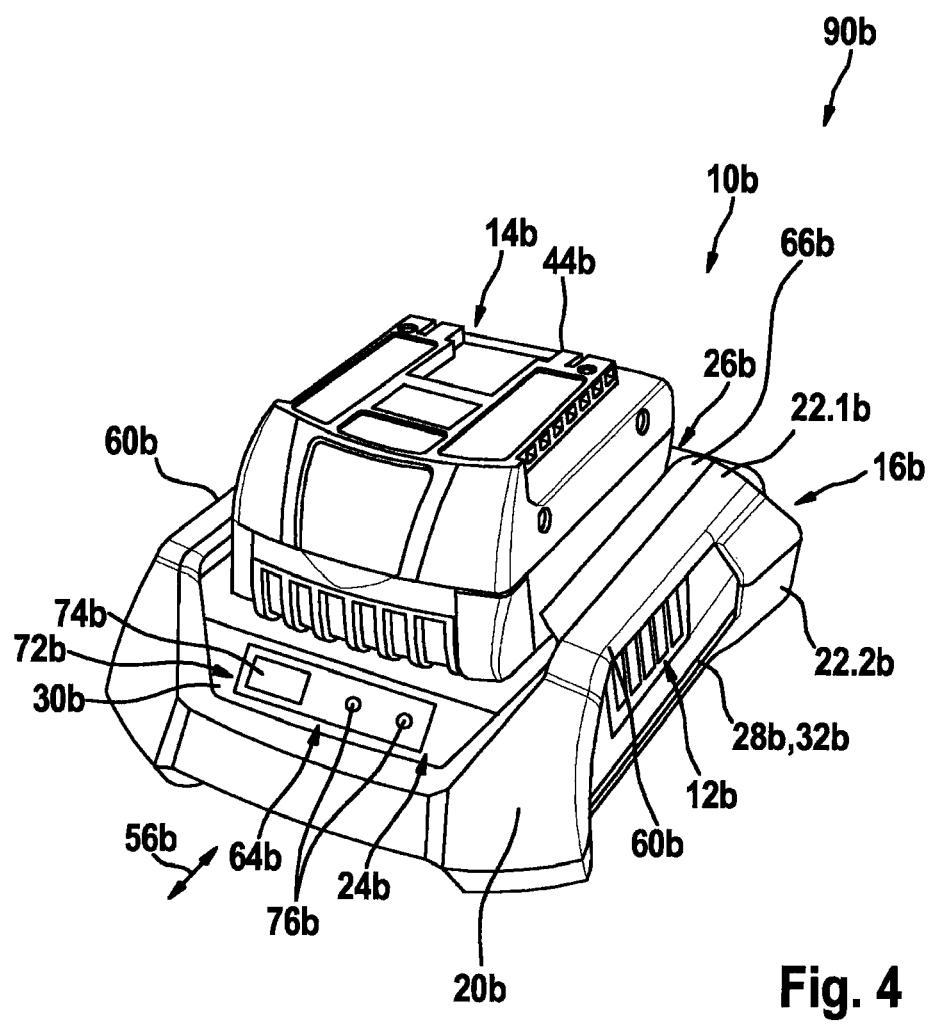
FIG. 4 shows one alternative embodiment of the inductive charging device according to the present invention, including an inductive charging unit and an alternative fastening unit, in a coupled state with an induction battery.

FIG. 4 illustrates an inductive charging device 10b, which includes an inductive charging unit 12b and a fastening unit 16b. Inductive charging unit 12b corresponds to already described inductive charging unit 12a. Fastening unit 16b has a design which is partially separate from inductive charging unit 12b. Fastening unit 16b includes a fastening frame 20b which has a design which is partially separate from inductive charging unit 12b, and which at least partially encloses inductive charging unit 12b in an installed state. Fastening frame 20b completely encloses inductive charging unit 12b in an installed state. Fastening frame 20b includes two frame elements 22.1b, 22.2b which are connected to one another. Frame elements 22.1b, 22.2b are joined together by a form-fit connection. Frame elements 22.1b, 22.2b are screwed together. However, other connections between frame elements 22.1b, 22.2b which appear meaningful to those skilled in the art are conceivable. In principle, it is also conceivable for fastening frame 20b to be designed as a single solid component. Fastening frame 20b is made of a plastic. Fastening frame 20b is provided for fastening an induction battery 14b to inductive charging unit 12b during a state of charge. Induction battery 14b corresponds to induction battery 14a already described.

Figure 5A:
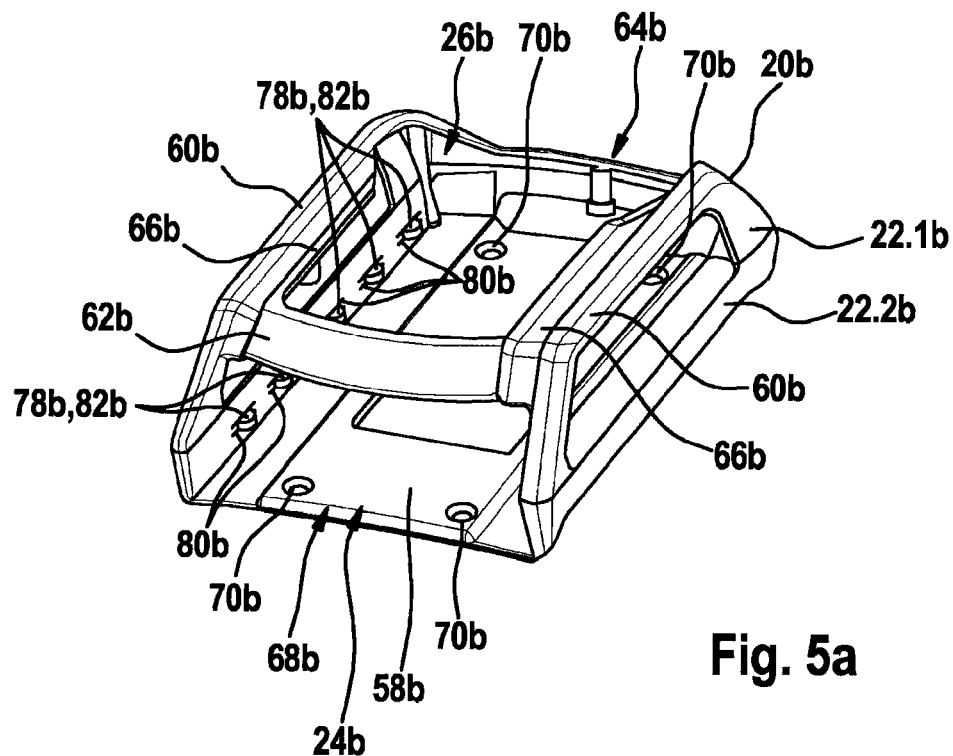
FIG. 5a shows a fastening frame of the alternative fastening unit, in a front view.
Figure 5B:
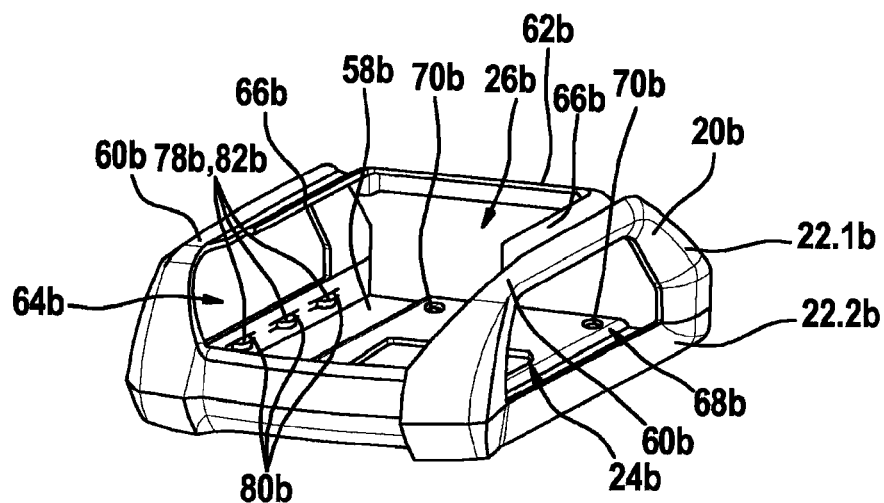
FIG. 5b shows the fastening frame of the alternative fastening unit, in a rear view.

Fastening frame 20b includes a support 58b which is formed from one of frame elements 22.1b, 22.2b, above which the two side bars 60b and a retaining bar 62b, extending transversely thereto on one side, rise (FIGS. 5a and 5b). Retaining bar 62b extends between side bars 60b. Fastening frame 20b forms a receiving area 24b for accommodating inductive charging unit 12b. Inductive charging unit 12b is placed on support 58b, and is then situated within fastening frame 20b. Fastening frame 20b forms a receiving area 26b for accommodating induction battery 14b. One side of fastening frame 20b, designed as an insertion opening 64b, is situated opposite from retaining bar 62b, and is provided for pushing induction battery 14b into form-fit elements 66b and onto receiving area 36b of inductive charging unit 12b (FIG. 4). Form-fit elements 66b are provided for enclosing retaining elements 56b of housing 44b of induction battery 14b from above during the state of charge, so that induction battery 14b is secured in a position on receiving area 36b of inductive charging unit 12b. Retaining elements 56b of inductive charging unit 12b have a design which at least partially corresponds to fastening frame 20b. Alternatively or additionally, it is also conceivable for fastening frame 20b to include ten fastening elements 78b which are provided for engaging with fastening elements 28.1b, which are designed as grooves 32b. FIG. 5a shows fastening frame 20b separately in a view from the front, in a view directed toward insertion opening 64b, and FIG. 5b shows fastening frame 20b separately in a view from the rear.

Fastening frame 20b includes a fastening area 68b which is provided for fastening fastening frame 20b to a workbench or to a toolbox, for example. Fastening area 68b is situated on support 58b. Fastening area 68b has multiple fastening openings 70b. Fastening frame 20b may be screwed down with the aid of screws, and thus fastened, via fastening openings 70b. However, it is also conceivable to fasten fastening frame 20b in some other way which appears meaningful to those skilled in the art.

Figure 6A:
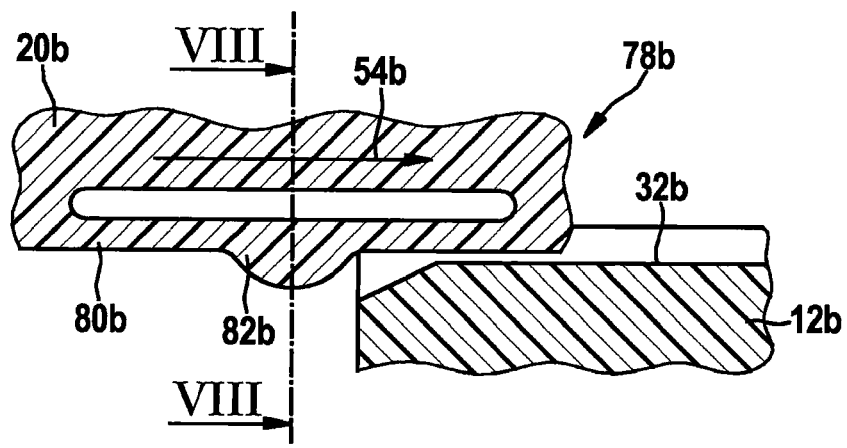
FIG. 6a shows a fastening element of the fastening frame of the alternative fastening unit in a schematic sectional illustration.
Figure 6B:
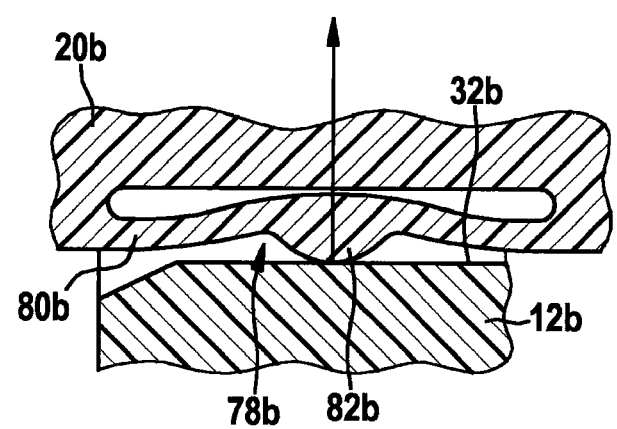
FIG. 6b shows the fastening element of the fastening frame of the alternative fastening unit in an installed state of the fastening frame, in a schematic sectional illustration.

Fastening elements 78b of fastening frame 20b each include a spring element 80b and a bearing lug 82b. Bearing lugs 82b are each elastically situated perpendicularly with respect to insertion direction 54b and in parallel to an insertion plane with the aid of spring elements 80b. With the aid of the particular spring element 80b, each bearing lug 82b is thus movably supported along a plane which extends at least essentially perpendicularly with respect to the insertion plane. During the insertion operation and in an inserted operating state of inductive charging unit 12b in fastening frame 20b, a base of grooves 32b exerts at least one force on bearing lugs 82b, thus partially deflecting bearing lugs 82b inwardly (FIGS. 6a and 6b). Fastening frame 20b is in contact with grooves 32b of inductive charging unit 12b via bearing lugs 82b. The at least one force supports fastening frame 20b on inductive charging unit 12b. Except for an insertion bevel having an angle of 45° with respect to insertion direction 54b, grooves 32b have a uniform groove profile along insertion direction 54b. Bearing lugs 82b of spring elements 80b of fastening frame 20b may therefore be inserted into grooves 32b of inductive charging unit 12b on both sides, i.e., "forwards" and "backwards," based on insertion direction 54b shown. Fastening frame 20b and inductive charging unit 12b are fixable in the inserted operating state due to static friction between bearing lugs 82b and grooves 32b. In addition, detent, fixing, and/or stop means, not illustrated in greater detail, which appear meaningful to those skilled in the art may be provided to secure fastening frame 20b in the inserted operating state. Overall, viewed along insertion direction 54b, at least two fastening elements 78b are situated in succession. Overall, viewed along insertion direction 54b, in each case five fastening elements 78b are situated in succession on two opposite sides of fastening frame 20b. Spring elements 80b are designed as bar spring elements on which a bearing lug 82b is situated in each case. Spring elements 80b together with bearing lugs 82b are designed in one piece with fastening frame 20b. Along spring elements 80b, bearing lugs 82b are separated from the rest of the housing of fastening frame 20b via a slot, and are connected to the particular spring element 80b at the ends thereof.

Bearing lugs 82b have sliding surfaces with which bearing lugs 82b rest on grooves 32b during the insertion operation and in the inserted operating state. In a powerless state of spring elements 80b, the greatest distance between mutually opposite sliding surfaces, perpendicular to insertion direction 54b, is greater than the greatest distance, perpendicular to insertion direction 54b, between the groove bases of the two mutually opposite grooves 32b perpendicular to insertion direction 54b. When fastening frame 20b is pushed onto inductive charging unit 12b, spring elements 80b therefore partially deflect inwardly, so that grooves 32b in each case exert the force on bearing lugs 82b. Fastening frame 20b is supported via bearing lugs 82b on grooves 32b of inductive charging unit 12b. Soiling and/or tolerances of grooves 32b or of bearing lugs 82b may be compensated for by inward and/or outward deflection of bearing lugs 82b, so that jamming and/or excessive wear of bearing lugs 82b and/or grooves 32b may be avoided. Due to the forces, fastening frame 20b in an installed state is supported on inductive charging unit 12b free of play. Fastening frame 20b is positioned with respect to inductive charging unit 12b in such a way that a force equilibrium exists with regard to the forces acting on bearing lugs 82b. Alternatively or additionally, it is also conceivable for fastening frame 20b to include at least one groove, and for inductive charging unit 12b to include at least one fastening element having a spring element and a bearing lug.

FIGS. 7a and 7b and FIGS. 8a, 8b, and 8c illustrate further conceivable embodiments of grooves 32c, 32d, 32e, 32f and of fastening elements 78c, 78d, 78e, 78f together with spring element 80c, 80d, 80e, 80f and bearing lug 82c, 82d, 82e, 82f.

Figure 7A:
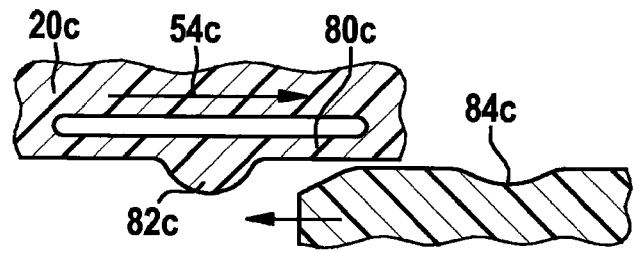
FIG. 7a shows a schematic illustration of the fastening element of the fastening frame, and a groove of the inductive charging unit with a detent recess, in an alternative embodiment.
Figure 7B:
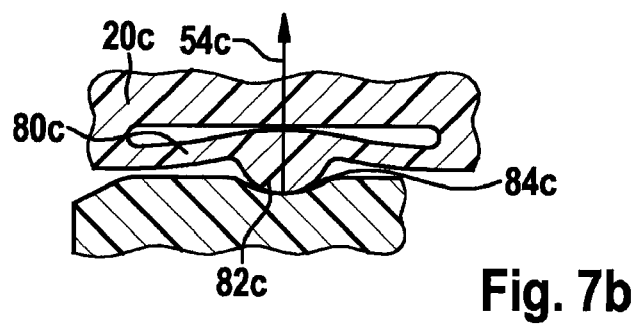
FIG. 7b shows a schematic illustration of the fastening element of the fastening frame and the groove of the inductive charging unit with a detent recess in the alternative embodiment, in an installed state of the fastening frame.

Groove 32c illustrated in FIGS. 7a and 7b has detent recesses 84c with which bearing lugs 82c engage in an inserted operating state. In a powerless state of spring elements 80c, the greatest distance between mutually opposite sliding surfaces of bearing lugs 82c, perpendicular to insertion direction 54c, is greater than the greatest distance, perpendicular to insertion direction 54c, of a detent base from detent recesses 84c of two mutually opposite grooves 32c perpendicular to insertion direction 54c. Thus, grooves 32c exert a force on bearing lugs 82c, even in the engaged state, so that fastening frame 20c remains free of play relative to inductive charging unit 12c, even in the engaged state. Detent recesses 84c are rounded on both sides in insertion direction 54c, so that the detent connection is detachable by acting on inductive charging unit 12c with a force against insertion direction 54c, relative to fastening frame 20c, which is sufficient to push bearing lugs 82c out of detent recesses 84c. Except for insertion bevels having an angle of 45° with respect to insertion direction 54c, which simplify insertion, and detent recesses 84c, grooves 32c have a uniform groove profile along insertion direction 54c.

The groove profiles of grooves 32c and the sliding surface profiles of bearing lugs 82c have a suitable design for absorbing forces perpendicular to an insertion plane and positioning the inductive charging unit perpendicularly with respect to the insertion plane, relative to the fastening frame.

Figure 8A:
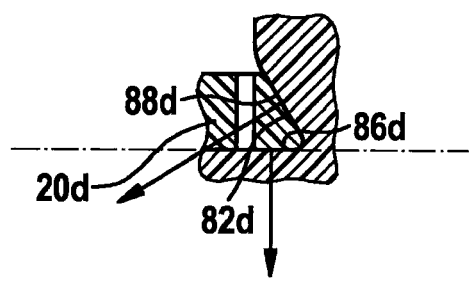
FIG. 8a shows a schematic illustration of one alternative profile variant of the groove and the bearing lug, in a schematic sectional illustration.
Figure 8B:
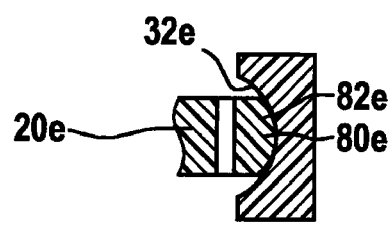
FIG. 8b shows a schematic illustration of another alternative profile variant of the groove and the bearing lug, in a schematic sectional illustration.
Figure 8C:
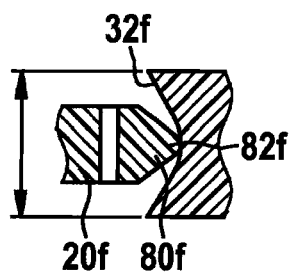
FIG. 8c shows a schematic illustration of another alternative profile variant of the groove and the bearing lug, in a schematic sectional illustration.

FIGS. 8a, 8b, and 8c illustrate three particularly advantageous groove profiles of groove 32d, 32e, 32f and sliding surface profiles of bearing lugs 82d, 82e, 82f. The groove profile of groove 32d has a flank 86d which is in parallel to an insertion plane. A further flank 88d forms an angle of 60° with the insertion plane (FIG. 8a). Further flank 56a supports the force, provided as an elastic force, with a force component perpendicular to flank 88d, thus generating a contact force which presses bearing lug 82d against flank 86d of groove 32d. The position of inductive charging unit 12d relative to fastening frame 20d is thus fixed with respect to the insertion plane in a particularly precise manner Parallel flanks 86d form the insertion plane in this case. FIGS. 8b and 8c show variants with a groove 32e having a circular groove profile, and with a groove 32f having a parabolic groove profile, as well as adapted sliding surface profiles of bearing lugs 82e and 82f. The groove profiles represent a floating bearing with respect to an insertion plane, which seeks a middle position in which the sliding surfaces transverse to insertion direction 54e, 54f of mutually facing bearing lugs 82e, 82f have the greatest spacing in grooves 32e, 82f. For the circular groove profile of groove 32e, bearing lug 82e likewise has a circular sliding surface profile, resulting in a comparatively robust bearing with high bearing friction, which is able to absorb large bearing forces. The parabolic groove profile of groove 32f is combined with a tapered bearing lug 82f which has a sliding surface profile that is rounded with a small radius of less than 10% of a groove height. Bearing lug 82e, 82f, which rests against groove 32e, 32f with only a small sliding surface, may be moved particularly smoothly in insertion direction 54e, 54f and aligned particularly precisely with respect to the insertion plane.

Figure 9:
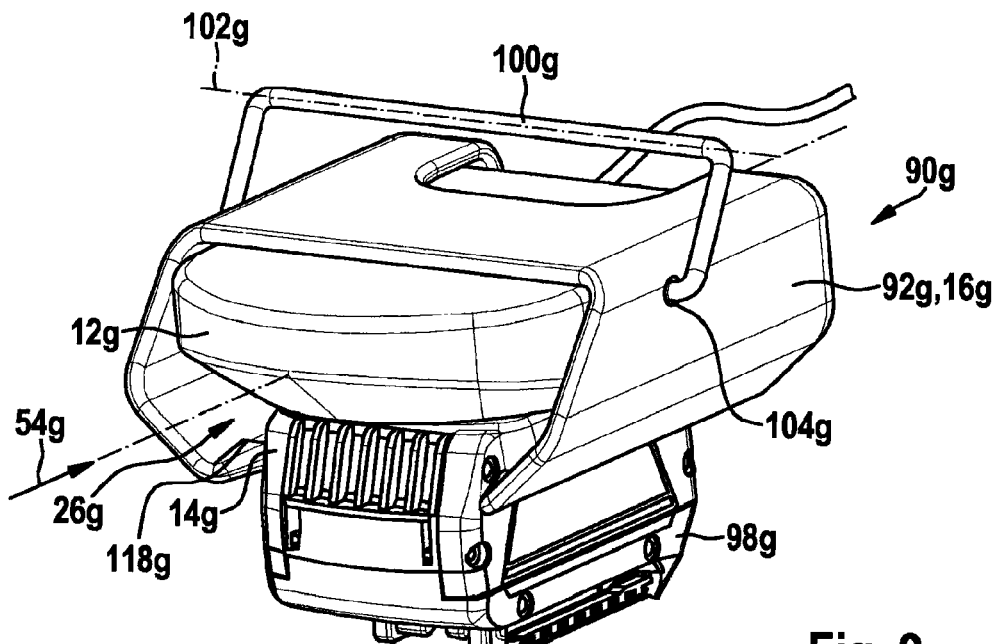
FIG. 9 shows a schematic illustration of an alternatively designed system, with a fastening unit which includes a system holder, an inductive charging unit, and an induction battery.
Figure 10:
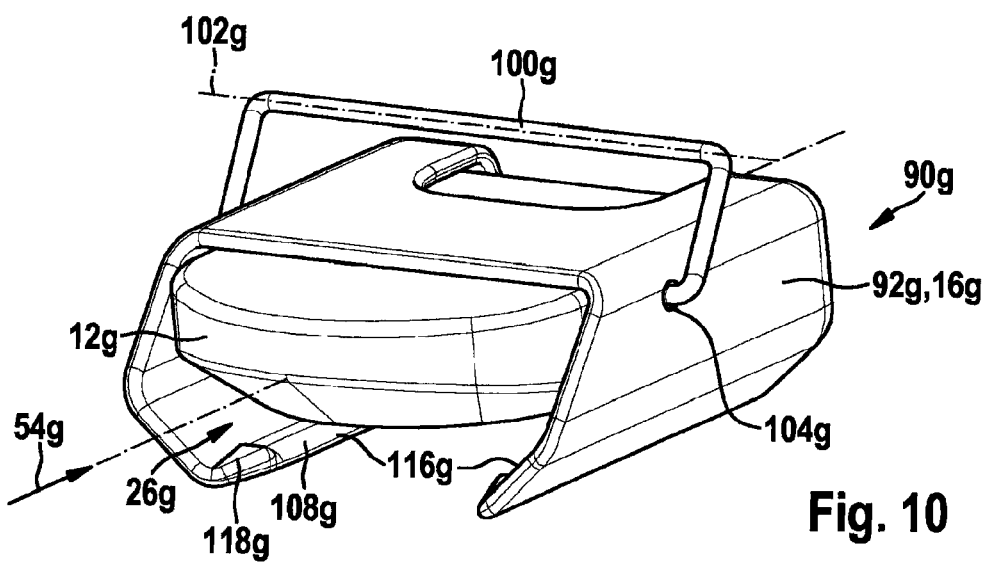
FIG. 10 shows a schematic illustration of the system holder of the fastening unit together with the inductive charging unit, in a perspective view.
Figure 11:
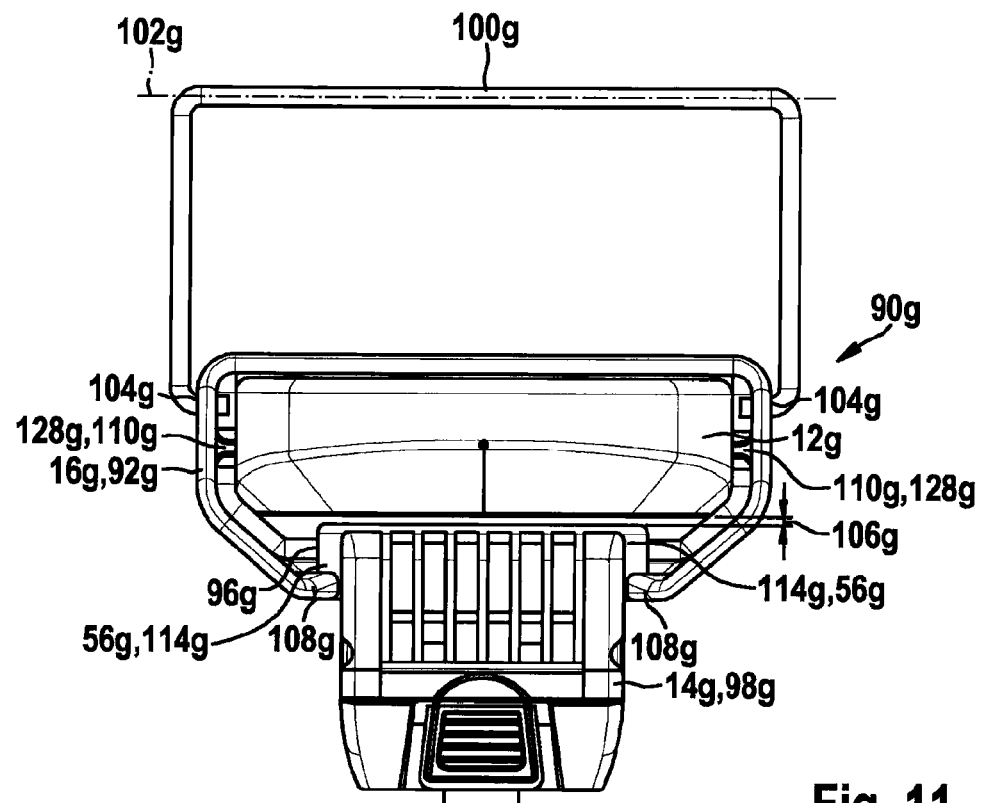
FIG. 11 shows a schematic illustration of the system holder of the fastening unit together with the inductive charging unit and the induction battery, in a front view.

FIGS. 9 through 11 show a schematic illustration of a system 90g designed as an inductive charging system, including a fastening unit 16g which includes a system holder 92g made of a plastic material, and an inductive charging unit 12g. System holder 92g delimits a receiving area 26g which is provided for accommodating inductive charging unit 12g and a charge interface 96g of a unit 98g to be charged, which in FIGS. 9 and 11 is designed as an induction battery 14g. Induction battery 14g is designed as a hand-held power tool rechargeable battery.

Figure 12:
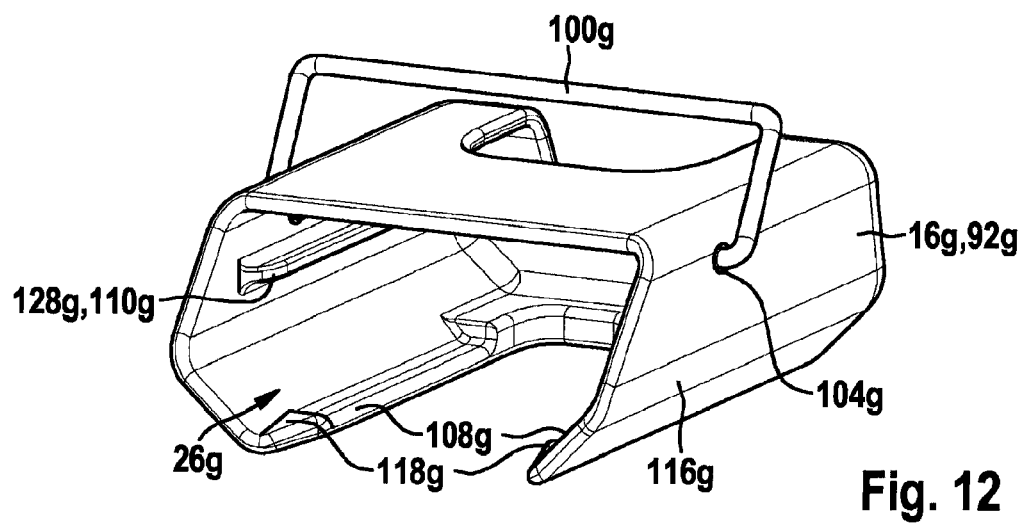
FIG. 12 shows a schematic illustration of the system holder of the fastening unit.

System holder 92g includes a fastening means which is designed as a bar 100g, and which is provided for supporting system 90g, movably suspended about an oscillating axis 102g, in an operational state (FIG. 12). Bar 100g is movably supported on system holder 92g about oscillating axis 102g at two bearing points 104g, and is situated essentially on a side of system holder 92g facing away from receiving area 26g.

Receiving area 26g includes bearing means 108g, 128g for supporting inductive charging unit 12g and charge interface 96g of unit 98g to be charged, at a distance of approximately 3 mm from an air gap 106g. For accommodating inductive charging unit 12g and charge interface 96g, these are inserted into receiving area 26g in the same insertion direction 54g. Charge interface 96g of unit 98g, designed as an induction battery 14g, may be inserted into receiving area 26g in two orientations which are rotated by 180° with respect to an axis that is perpendicular to oscillating axis 102g and to insertion direction 54g.

Figure 13:
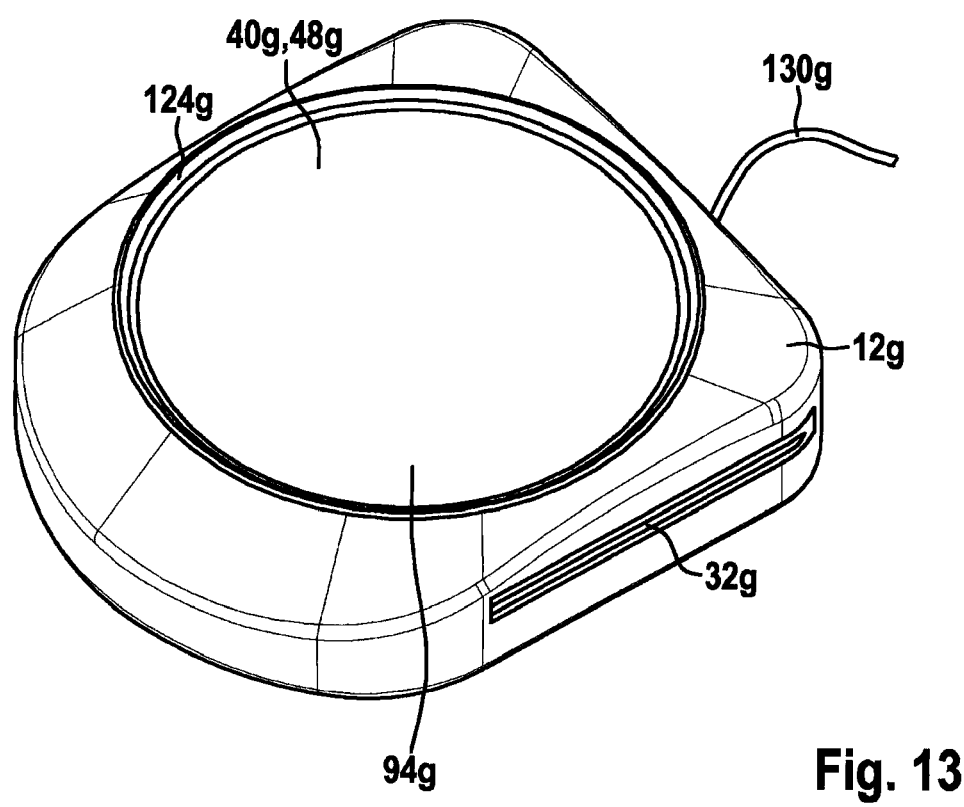
FIG. 13 shows a schematic illustration of the inductive charging unit in a perspective view.

FIG. 13 shows inductive charging unit 12g. Inductive charging unit 12g has a surface beneath which a transmitter coil, not illustrated here, for inductively transmitting energy is situated. The surface is designed as a recess 38g. A supply line 130g is used for supplying energy. Support channels which are formed by a groove 32g in each case and which are provided for supporting inductive charging unit 12g in system holder 92g are situated at the sides of inductive charging unit 12g. System holder 92g includes two support rails 110g within receiving area 26g which form bearing means 108g. Inductive charging unit 12g is pushed with the support channels, formed as grooves 32g, onto support rails 110g of receiving area 26g in insertion direction 54g, and is thus supported in receiving area 26g. Receiving area 26g encloses inductive charging unit 12g, about an axis in parallel to insertion direction 54g, by greater than 180°, so that inductive charging unit 12g together with system holder 92g forms a compact unit.

Figure 14:
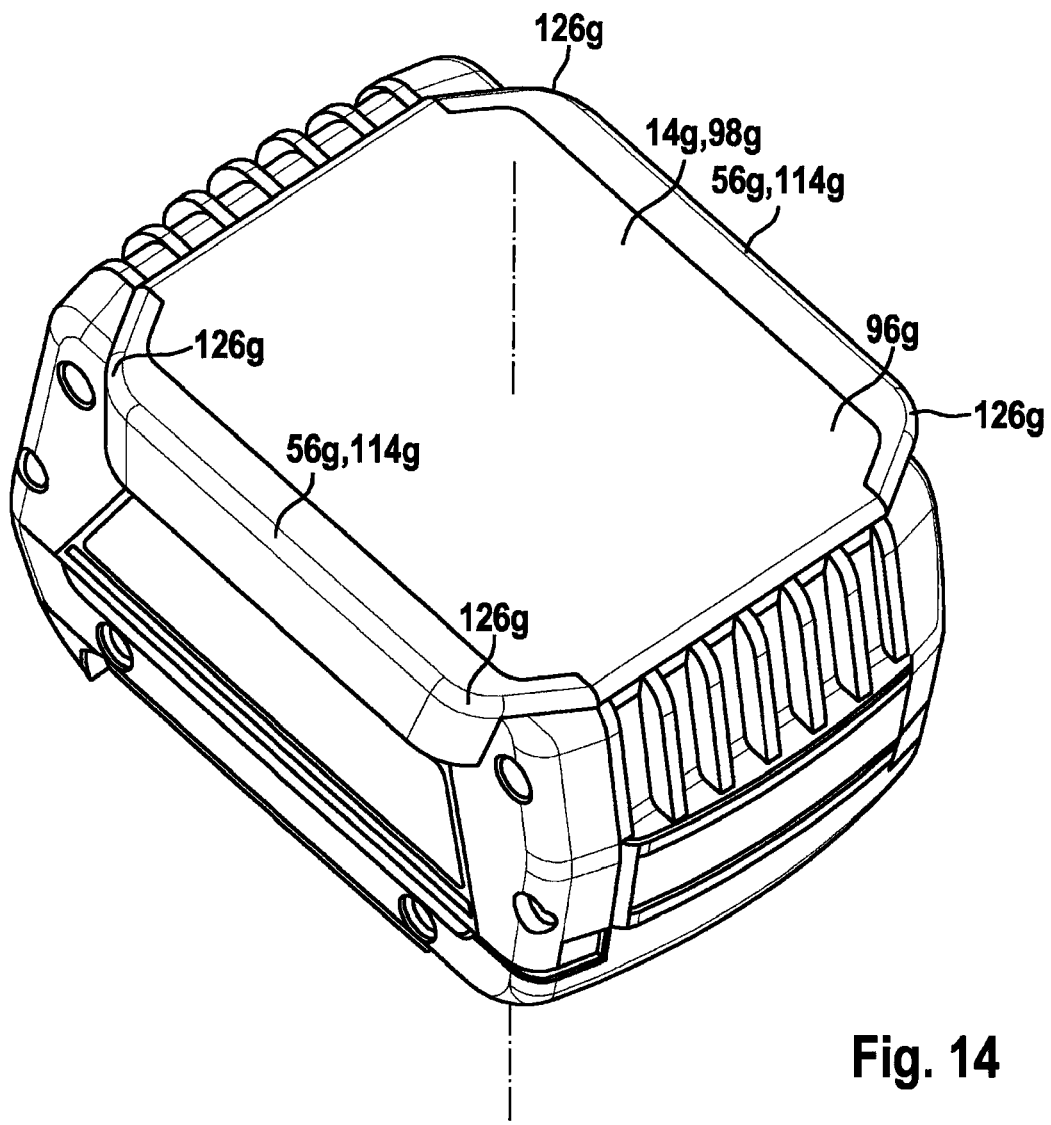
FIG. 14 shows a schematic illustration of a charge interface of the induction battery in a perspective view.
Figure 15:
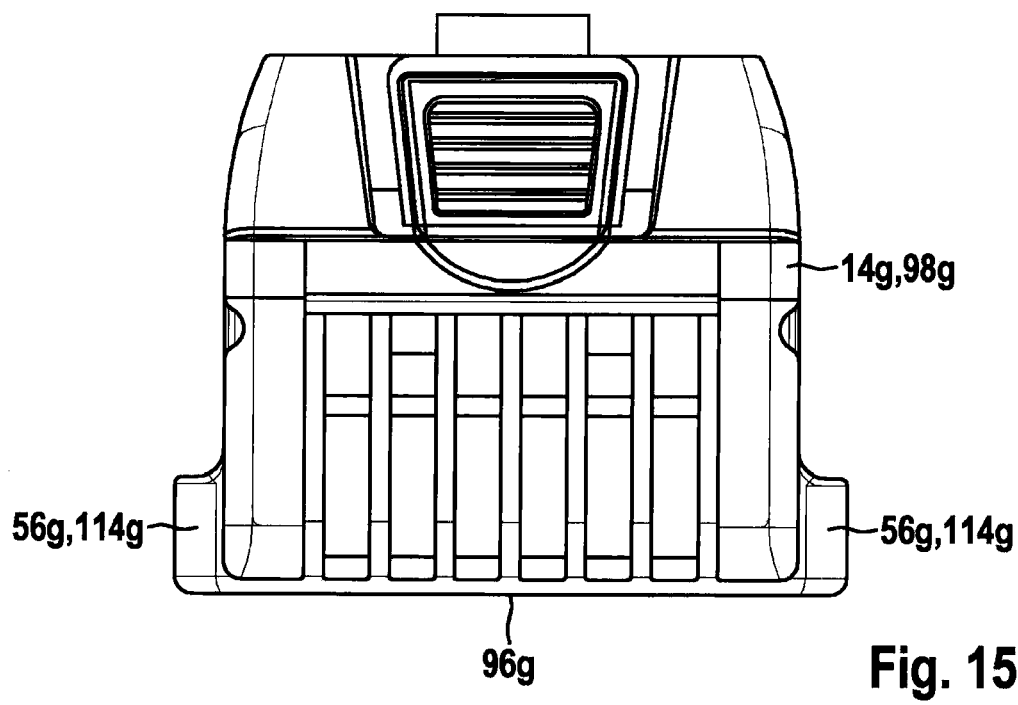
FIG. 15 shows a schematic illustration of the induction battery in a front view.

FIGS. 14 and 15 show charge interface 96g on induction battery 14g. Alternatively, charge interface 96g may also be situated, with a corresponding geometry, on a hand-held power tool 112g which includes an integrated induction battery 14g. Charge interface 96g has a surface beneath which a receiver coil, not illustrated in greater detail here, for inductively transmitting energy is situated. The surface is designed as a platform which corresponds to recess 48g. Two retaining elements 56g which are designed as receiving shoulders 114g and which are provided for supporting charge interface 96g in system holder 92g are situated on both sides of the surface. Receiving shoulders 114g are situated symmetrically with respect to an axis perpendicular to the surface and with respect to a center of the receiver coil, so that charge interface 96g may be inserted into system holder 92g in two orientations rotated by 180° with respect to this axis.

System holder 92g has two flanks 116g, which in an inserted state of charge interface 96g into system holder 92g support receiving shoulders 114g in a form-fit manner and form bearing means. At the end facing insertion direction 54g, flanks 116g are delimited by shoulders 118g which fix charge interface 96g, inserted into receiving area 26g, in a charging position and form securing means (FIG. 10). To remove charge interface 96g, it is lifted over shoulders 118g in the direction of inductive charging unit 12g and subsequently removed in the direction against insertion direction 54g. A height of shoulders 118g perpendicular to insertion direction 54g is smaller than the dimension of air gap 106g, so that receiving shoulders 114g of charge interface 96g may be lifted over shoulders 118g without colliding with inductive charging unit 12g. On the side facing away from interface 96g, induction battery 14g includes a unit interface 120g with which the induction battery may be connected to a hand-held power tool 112g. Unit interface 120g has a design which is adapted to hand-held power tool 112g, and which is independent of the configuration of charge interface 96g. By use of system 90g, various induction batteries 14g designed as hand-held power tool rechargeable batteries may be utilized with a different unit interface 120g, in which charge interface 96g corresponds to the design which is compatible with system 90g.

Figure 16:
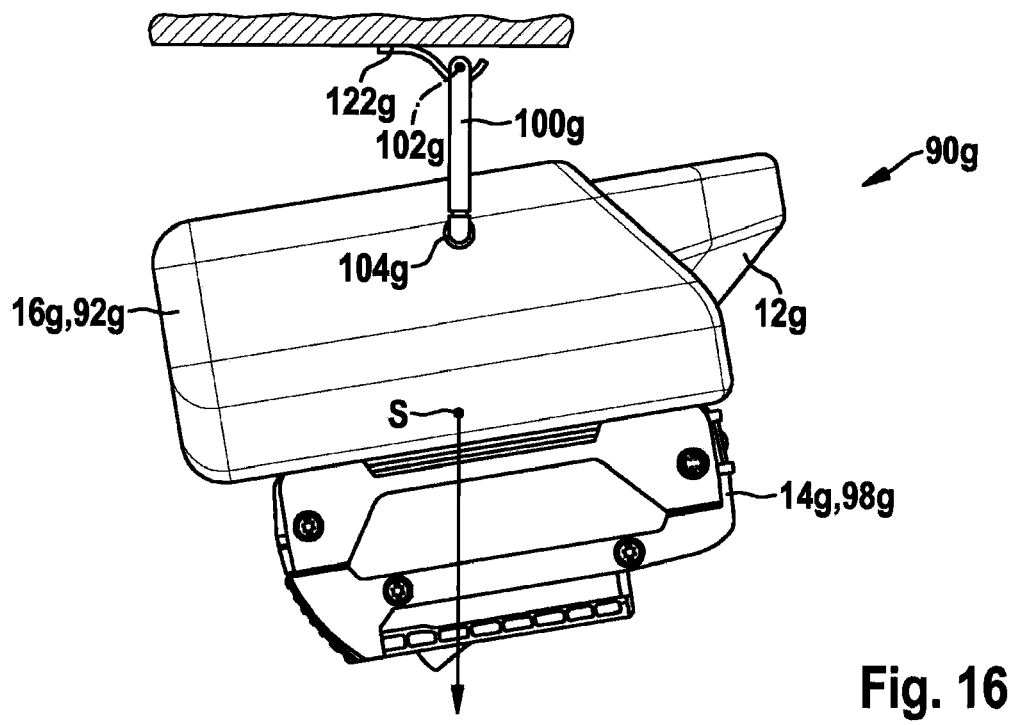
FIG. 16 shows a schematic illustration of the system with a suspended support, together with an inserted induction battery, in a side view.

FIG. 16 shows system 90g with induction battery 14g inserted, with a suspended support on bar 100g. A hook 122g in which bar 100g may be hung is mounted on a stationary body, such as a shelf. System 90g together with induction battery 14g is aligned corresponding to a weight force which acts at a center of gravity S of system 90g together with induction battery 14g, in such a way that oscillating axis 102g is nearly torque-free.

Figure 17:
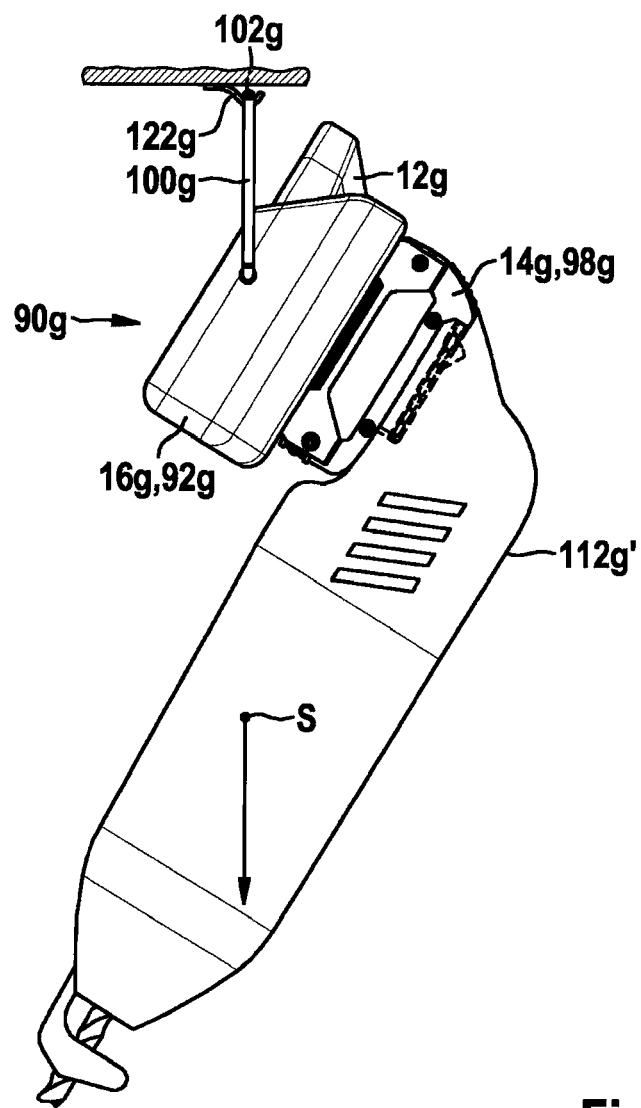
FIG. 17 shows a schematic illustration of the system with a suspended support, together with a hand reamer including an inserted induction battery, in a side view.
Figure 18:
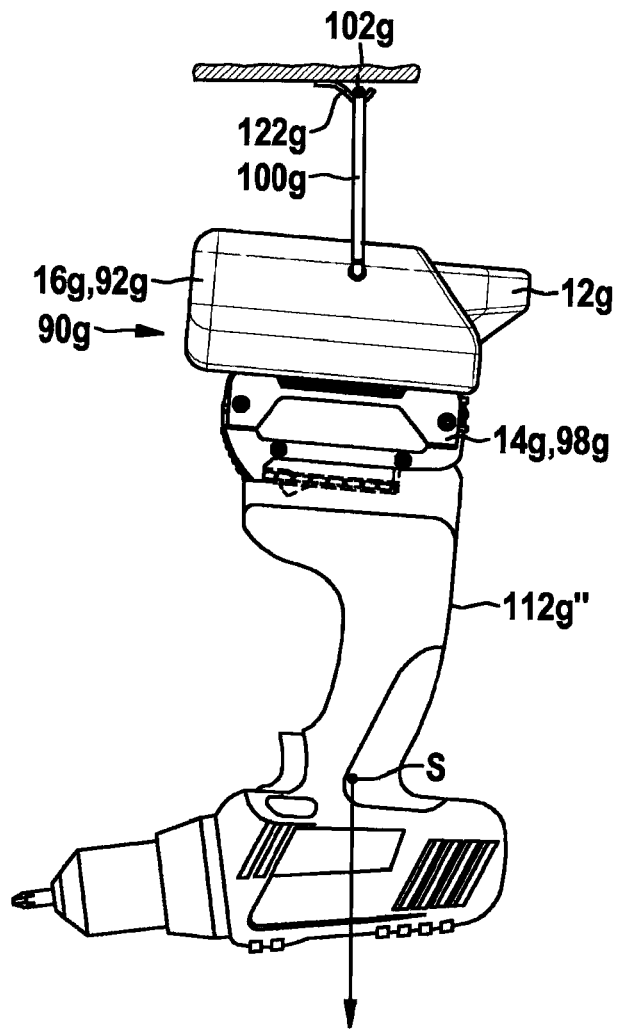
FIG. 18 shows a schematic illustration of the system with a suspended support, together with a screw drill including an inserted induction battery, in a side view.
Figure 19:
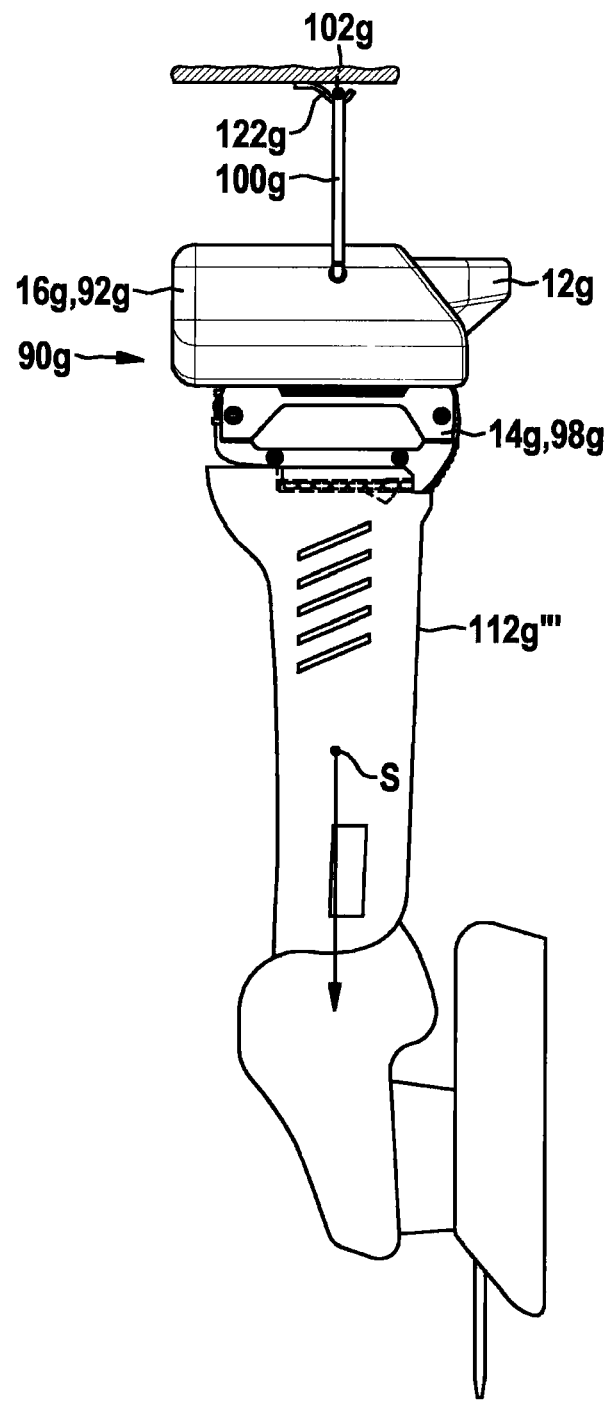
FIG. 19 shows a schematic illustration of the system with a suspended support, together with an angle grinder including an inserted induction battery, in a side view.
Figure 20:
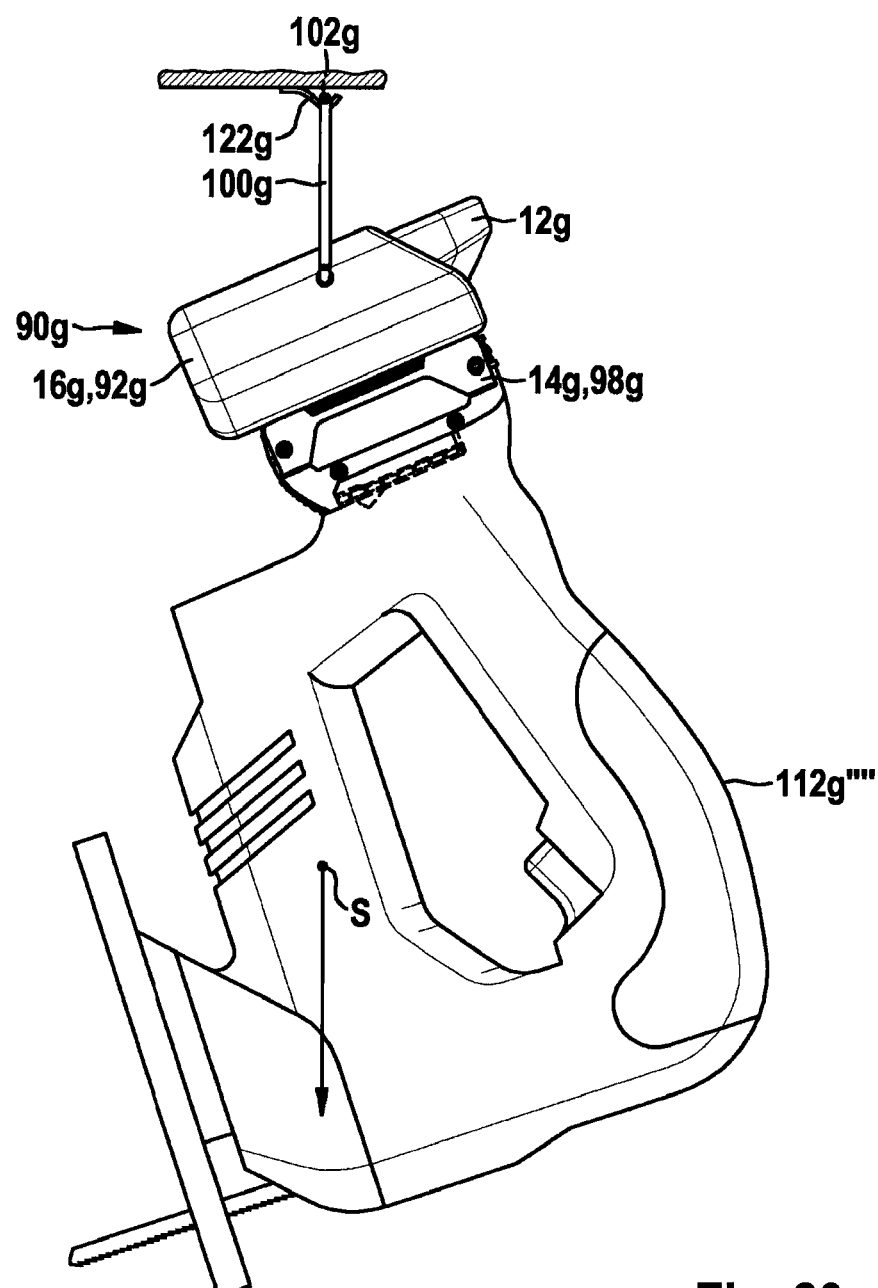
FIG. 20 shows a schematic illustration of the system with a suspended support, together with a jigsaw including an inserted induction battery, in a side view.
Figure 21:
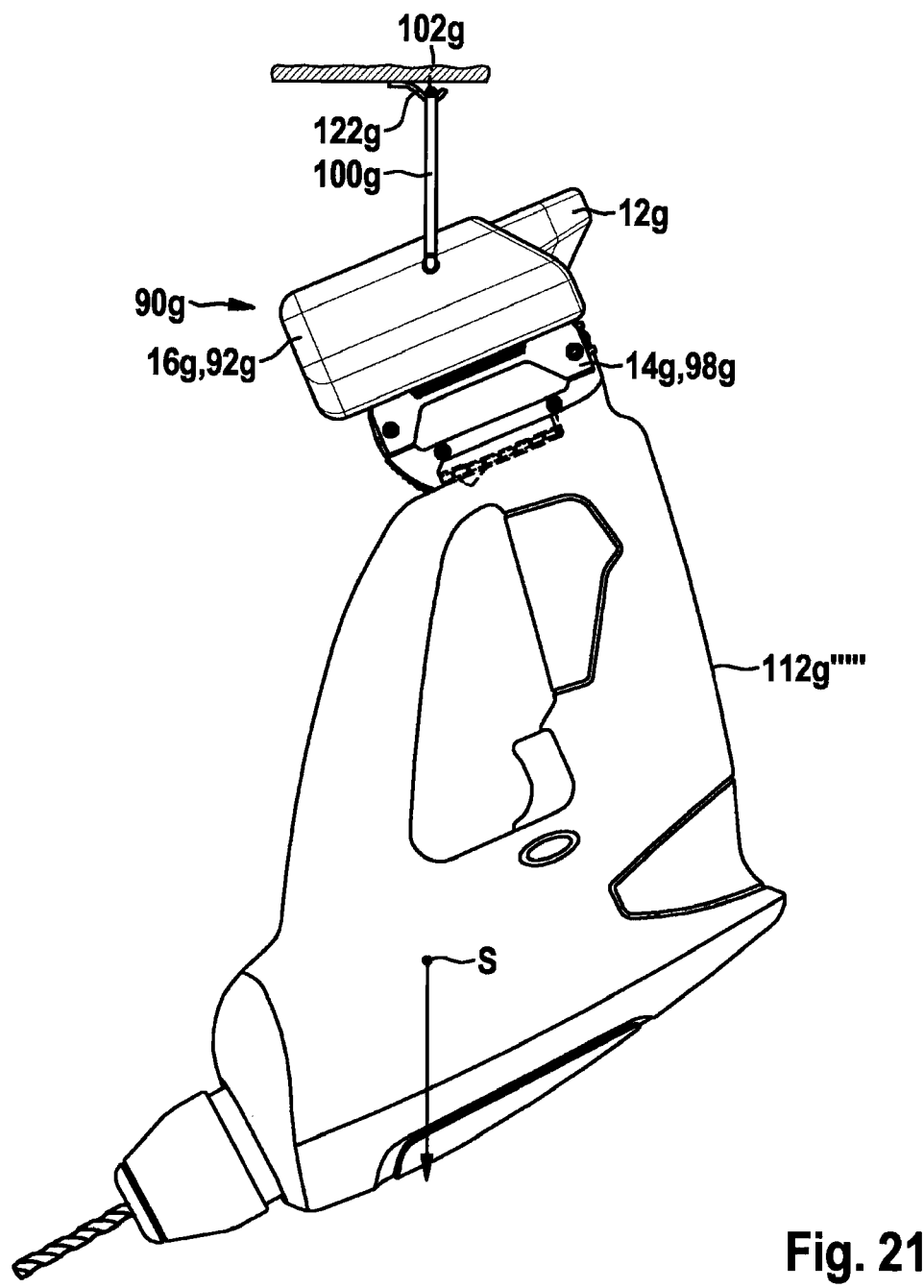
FIG. 21 shows a schematic illustration of the system with a suspended support, together with a drill hammer including an inserted induction battery, in a side view.

FIGS. 17 through 21 show system 90g with a selection of various possible hand-held power tools 112g', 112g'', 112g''', 112g'''', 112g''''' having different shapes, sizes, masses, and centers of gravity S. A hand-held power tool 112g' in FIG. 17 is designed as a hand reamer. A hand-held power tool 112g'' in FIG. 18 is designed as a screw drill. A hand-held power tool 112g''' in FIG. 19 is designed as an angle grinder. A hand-held power tool 112g'''' in FIG. 20 is designed as a jigsaw. A hand-held power tool 112g''''' in FIG. 21 is designed as a drill hammer Hand-held power tools 112g together with system 90g are aligned about oscillating axis 102g, in each case corresponding to their center of gravity S and weight, in such a way that they remain largely free of torque. System 90g may thus accommodate different hand-held power tools 112g, and charge and store them in a suspended manner.

Figure 22:
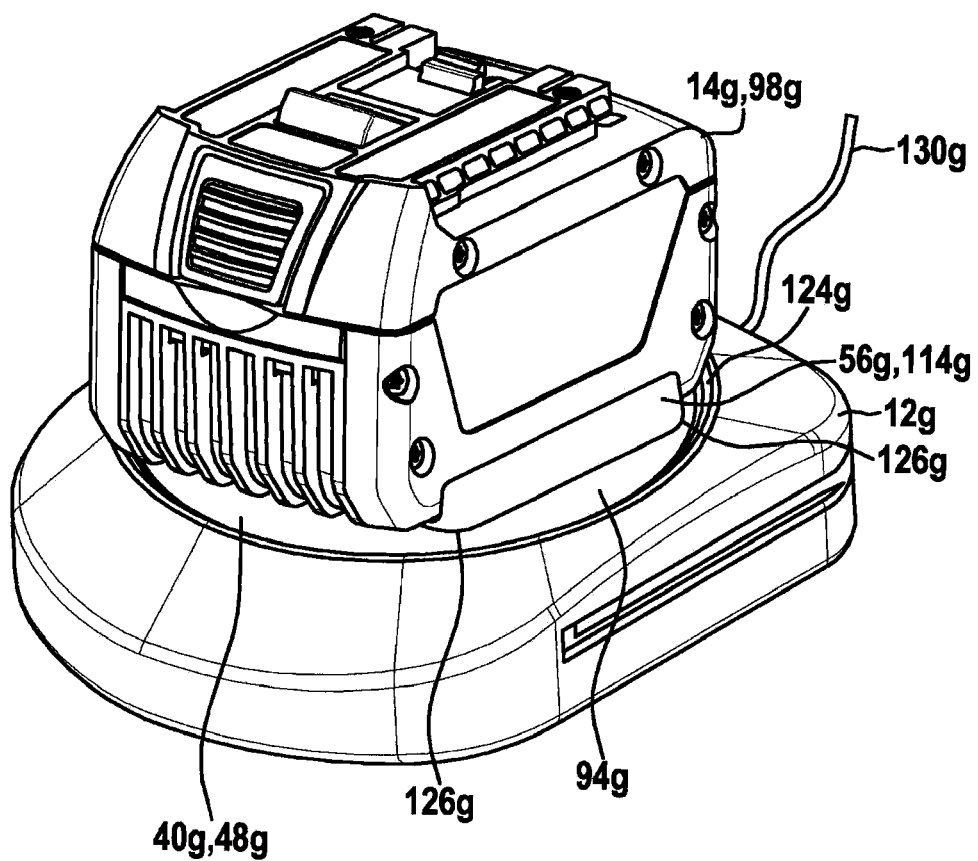
FIG. 22 shows a schematic illustration of one alternative possible use of the inductive charging unit together with the induction battery, without using the system holder of the fastening unit.

FIG. 22 shows one alternative possible use of inductive charging unit 12g together with induction battery 14g, without using system holder 92g. Induction battery 14g may be placed, with the surface of charge interface 96g, directly on the surface of inductive charging unit 12g, and may thus be directly charged. For positioning, inductive charging unit 12g has a circular border 124g, situated concentrically with respect to the transmitter coil, around the surface. The surface and border 124g form a positioning element 40g. Receiving shoulders 114g of induction battery 14g are delimited by circular segments 126g of a circle which is situated concentrically with respect to the receiver coil of induction battery 14g, the diameter of circular segments 126g being coordinated with the diameter of border 124g. When induction battery 14g is placed on inductive charging unit 12g, circular segments 126g are thus used for positioning the transmitter coil of inductive charging unit 12g concentrically with respect to the receiver coil of induction battery 14g, a tolerance between circular segments 126g and border 124g being allowed to an extent within which the degree of efficiency of the inductive transfer of energy is only slightly influenced. The charging coil and receiver coil are symmetrical, so that an orientation about the axes of symmetry of the charging coil and receiver coil does not affect the charging operation. In the same way, hand-held power tools 112g may also be charged directly with inductive charging unit 12g without using system holder 92g, provided that their geometry and their center of gravity allow secure placement with their charge interface 96g on inductive charging unit 12g.

What is claimed is:

1. An inductive charging device, comprising:
   an inductive charging unit for transferring energy in a coupled state with an induction battery; and
   a fastening unit for coupling the inductive charging unit to at least one of the at least one induction battery and at least one external unit in at least one state,
   wherein the fastening unit includes at least two retaining tabs which are at least partially fastened to the inductive charging unit on opposite sides of a housing of the inductive charging,
   wherein each retaining tab includes a first area extending parallel to a side of the housing, and a second area extending perpendicular to the first area and parallel to a receiving area of the inductive charging unit, wherein the receiving area is configured for accommodating the inductive charging unit and the induction battery.

2. The inductive charging device as recited in claim 1, wherein the inductive charging device is a hand-held power tool inductive charging device.

3. The inductive charging device as recited in claim 1, wherein the fastening unit is at least partially separate from the inductive charging unit.

4. The inductive charging device as recited in claim 3, wherein the fastening unit includes at least one fastening frame that at least partially encloses the inductive charging unit in at least an installed state.

5. The inductive charging device as recited in claim 1, wherein the fastening unit includes at least one fastening element that is fixedly mounted on the housing of the inductive charging unit.

6. The inductive charging device as recited in claim 5, wherein the at least one fastening element includes a groove.

7. The inductive charging device as recited in claim 5, wherein the at least one fastening element is detachably connected to the housing of the inductive charging unit.

8. The inductive charging device as recited in claim 5, wherein the at least one fastening element is at least partially elastically supported relative to the housing of the inductive charging unit.

9. A system, comprising:
   an inductive charging device, including:
      an inductive charging unit for transferring energy in a coupled state with an induction battery, and
      a fastening unit for coupling the inductive charging unit to at least one of the at least one induction battery and at least one external unit in at least one state, wherein the fastening unit includes at least two retaining tabs which are at least partially fastened to the inductive charging unit on opposite sides of a housing of the inductive charging unit; and
   at least one induction battery,
      wherein each retaining tab includes a first area extending parallel to a side of the housing, and a second area extending perpendicular to the first area and parallel to a receiving area of the inductive charging unit, wherein the receiving area is configured for accommodating the inductive charging unit and the induction battery.

10. The system as recited in claim 9, wherein the induction battery includes a hand-held power tool induction battery.

* * * * *